Feb. 6, 1962 H. C. PLUMMER 3,019,602
SPEED REGULATOR FOR PRIME MOVERS
Filed May 6, 1957 8 Sheets-Sheet 1
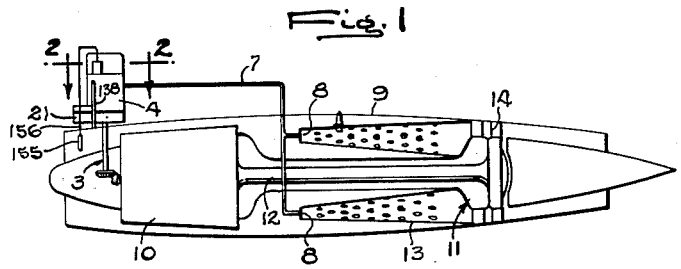
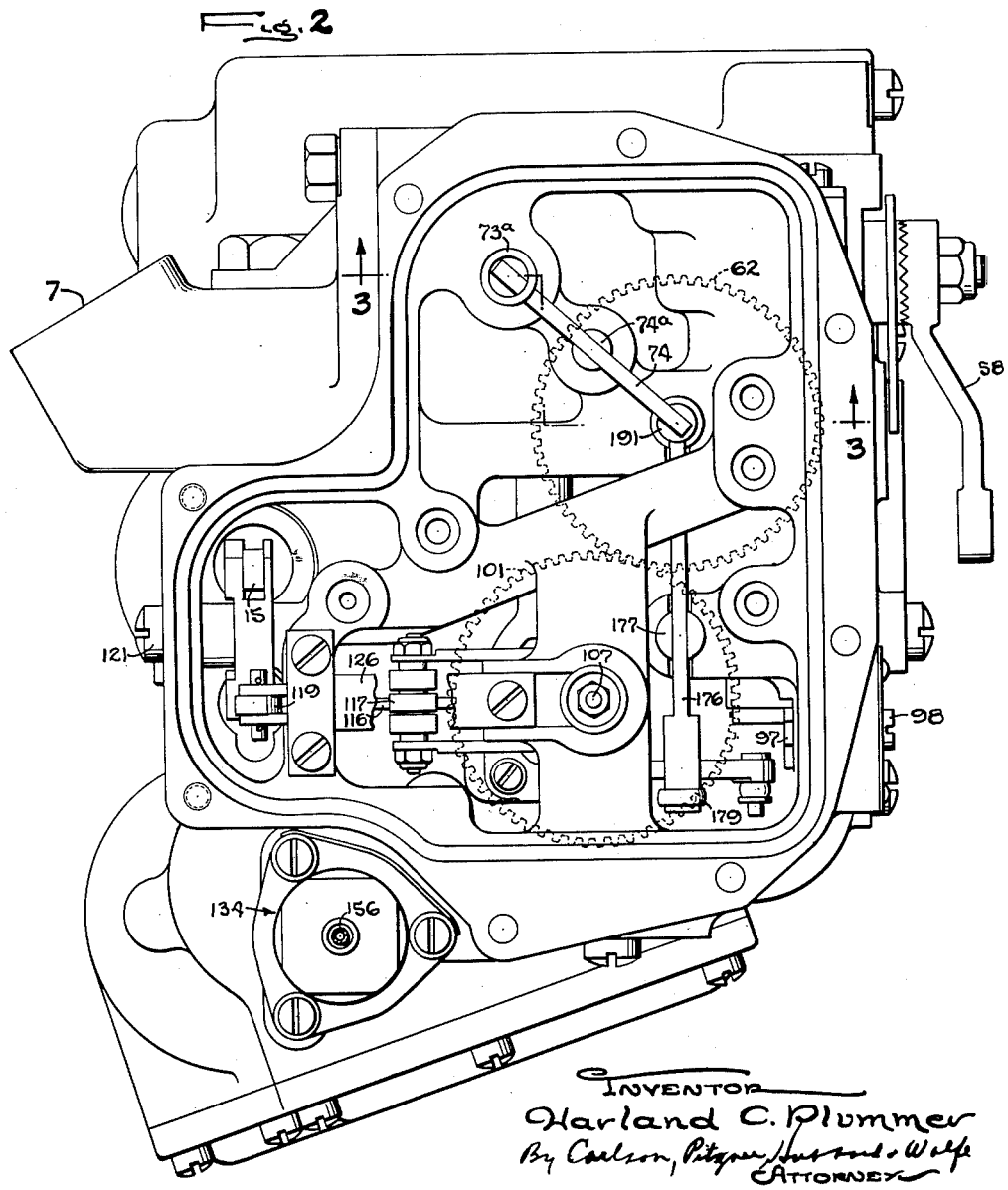
INVENTOR
Harland C. Plummer
By Carlson, Pitzner, Hubbard·Wolfe
ATTORNEY

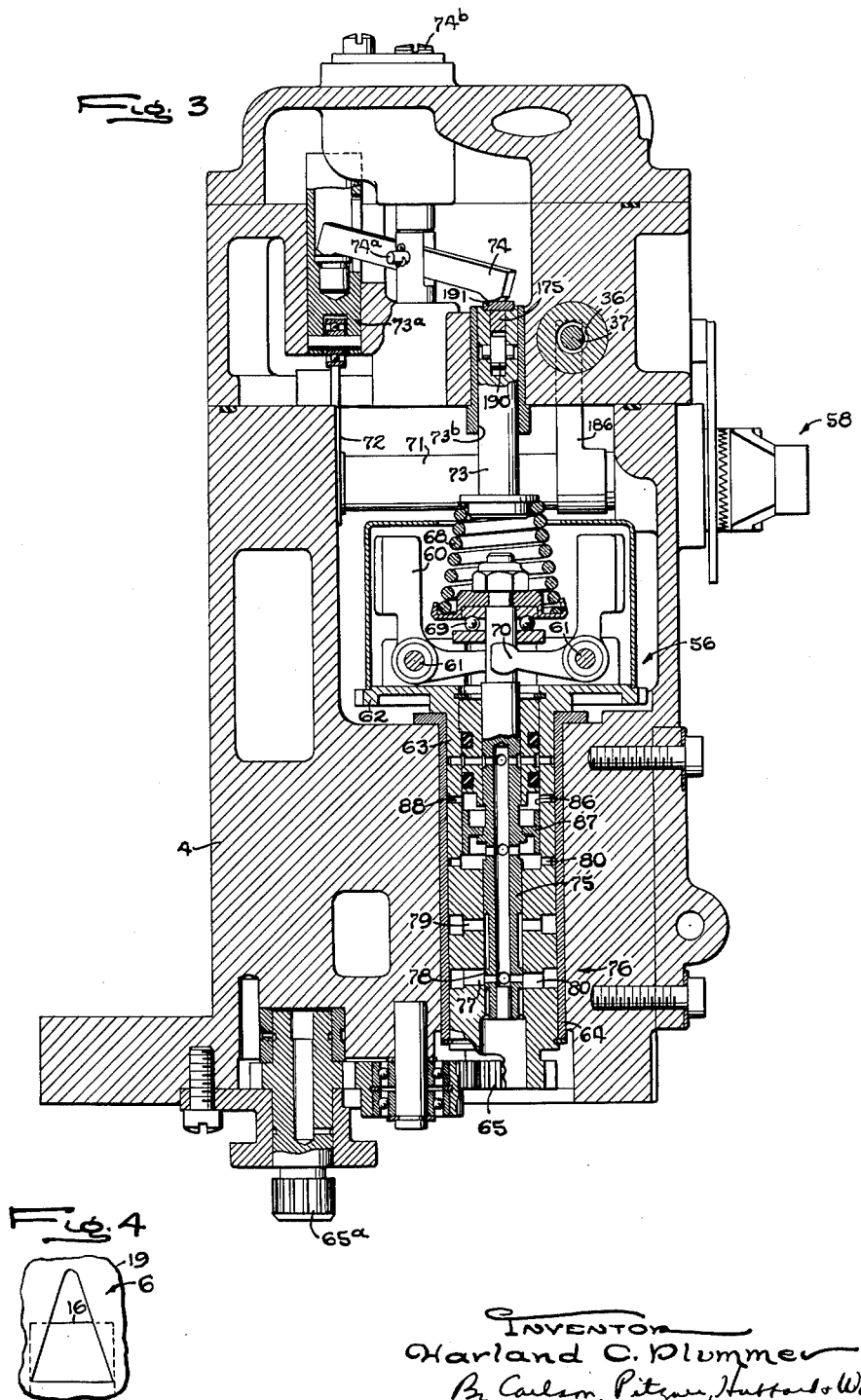

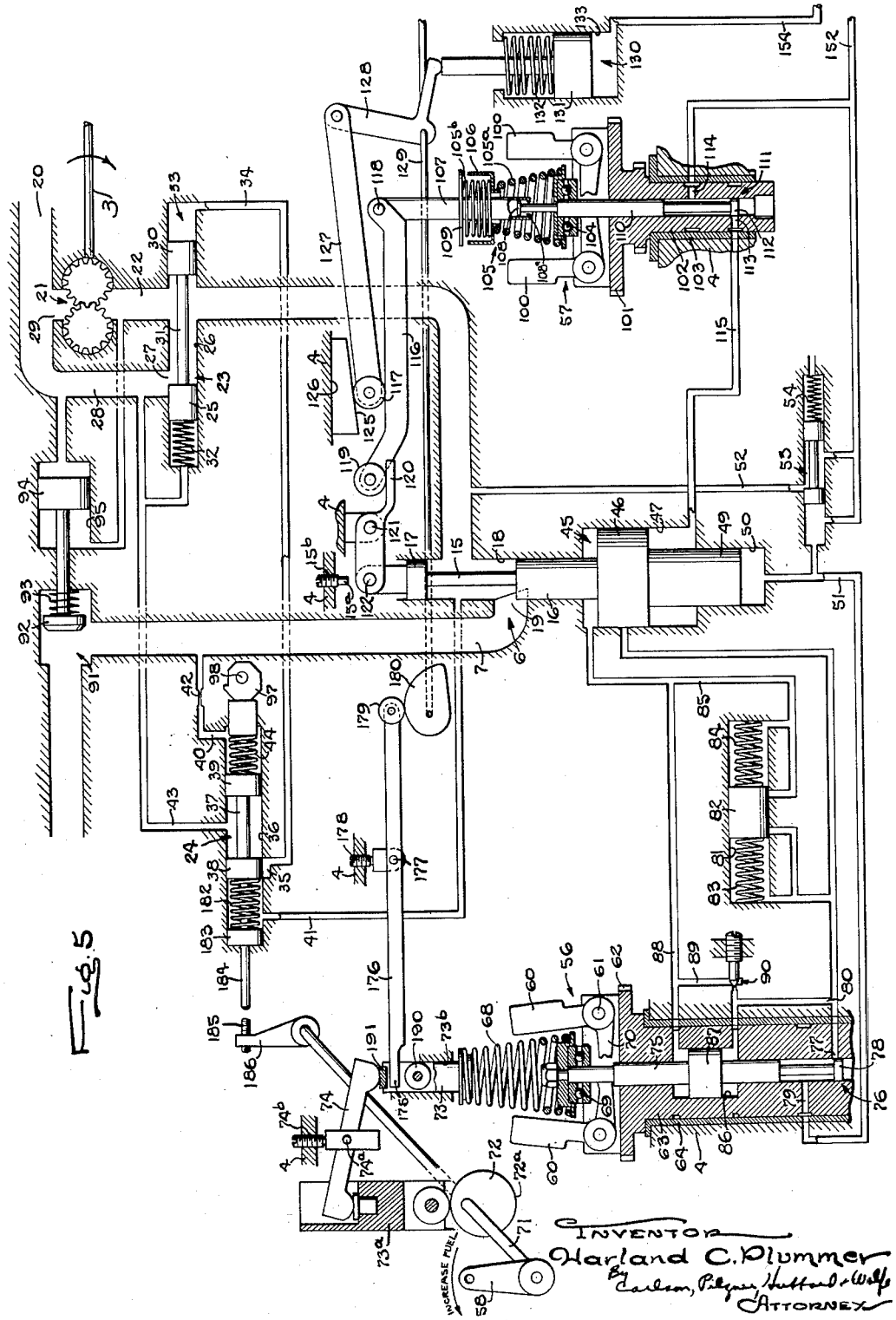

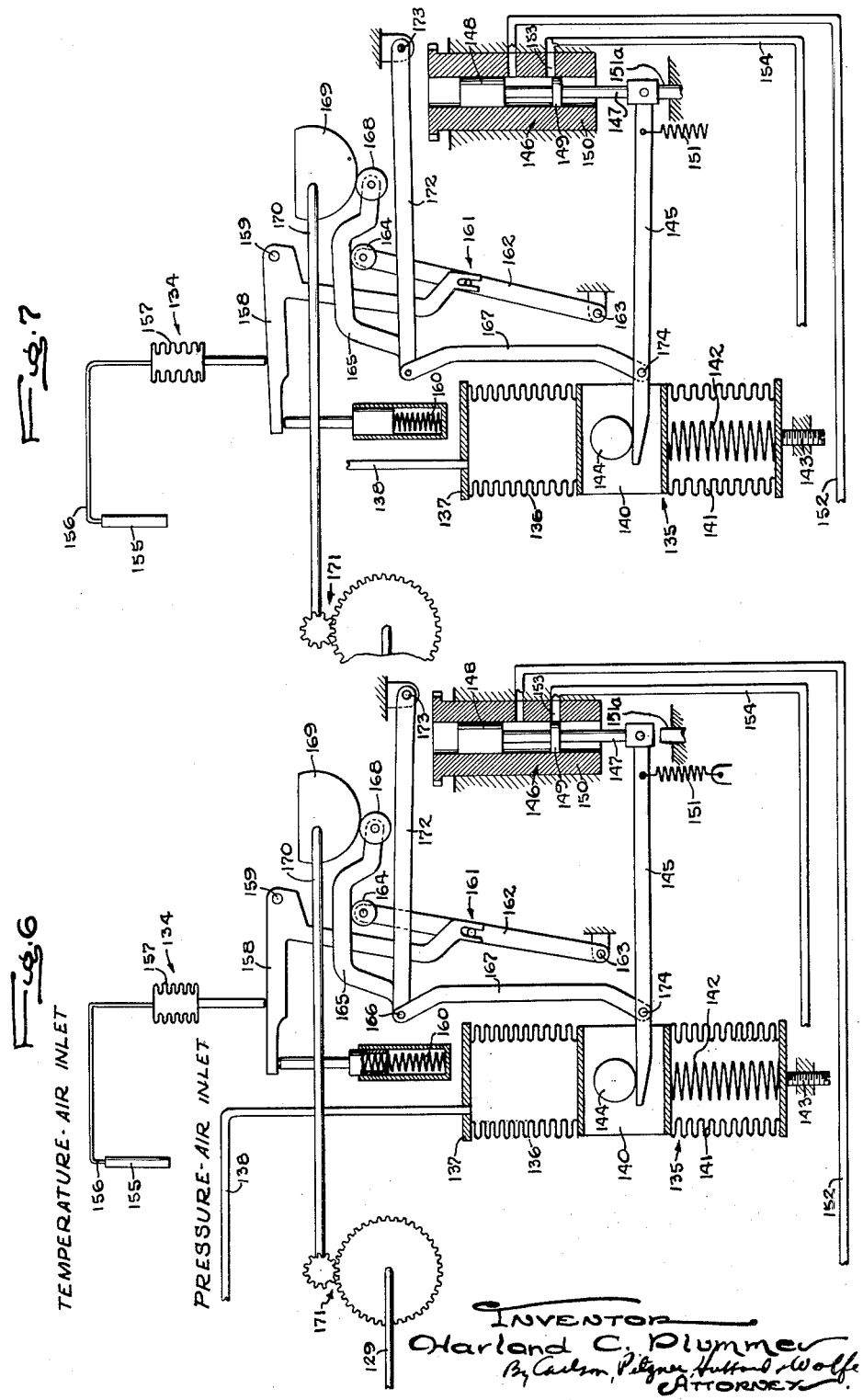

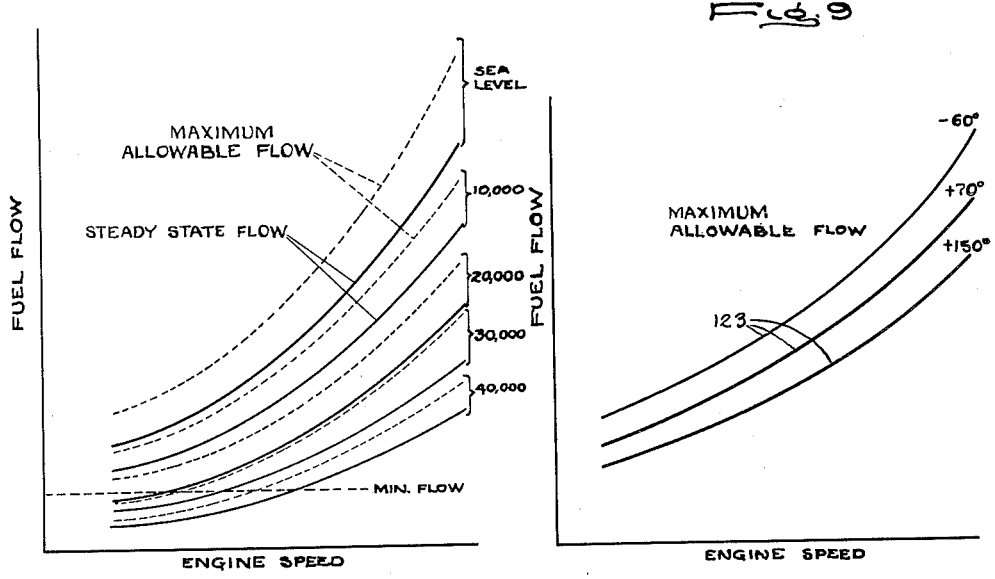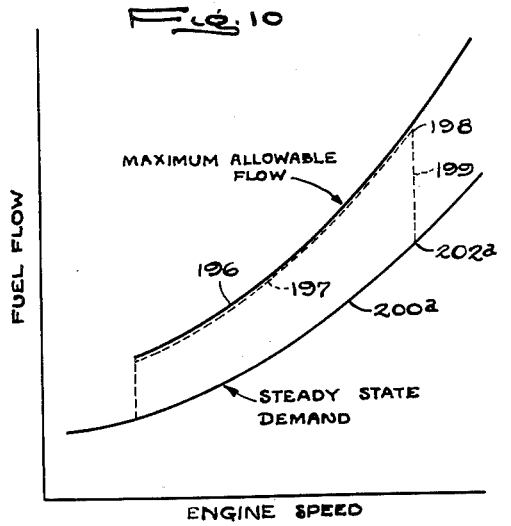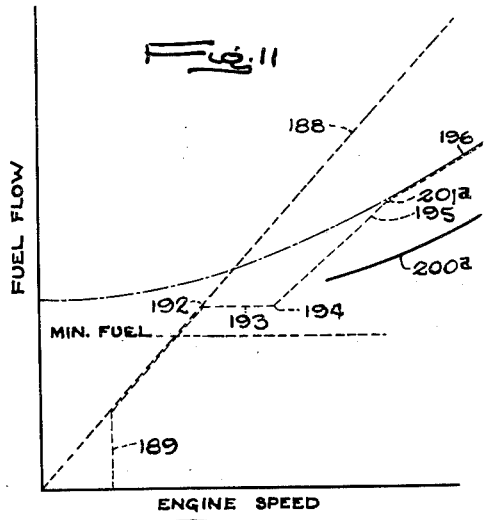

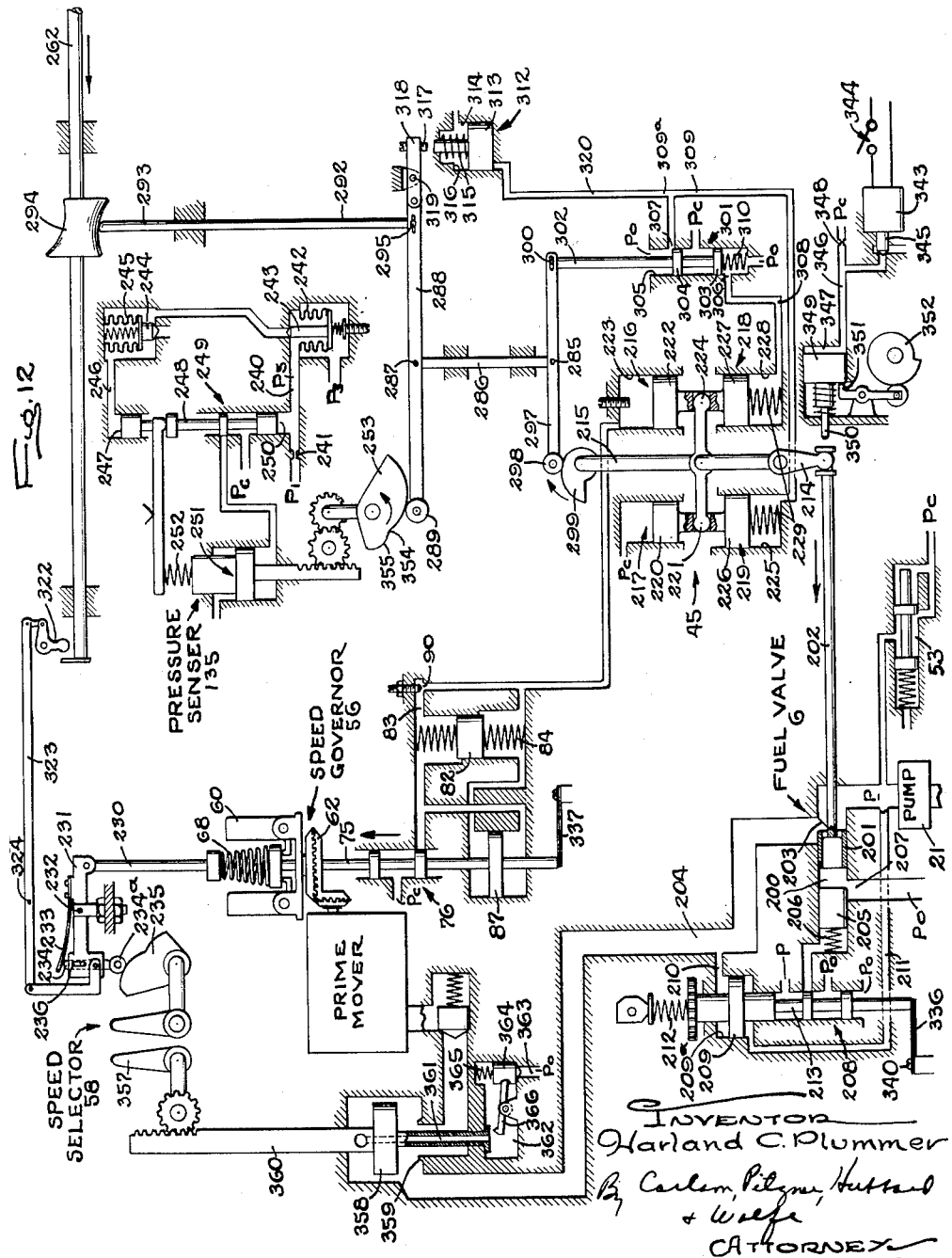

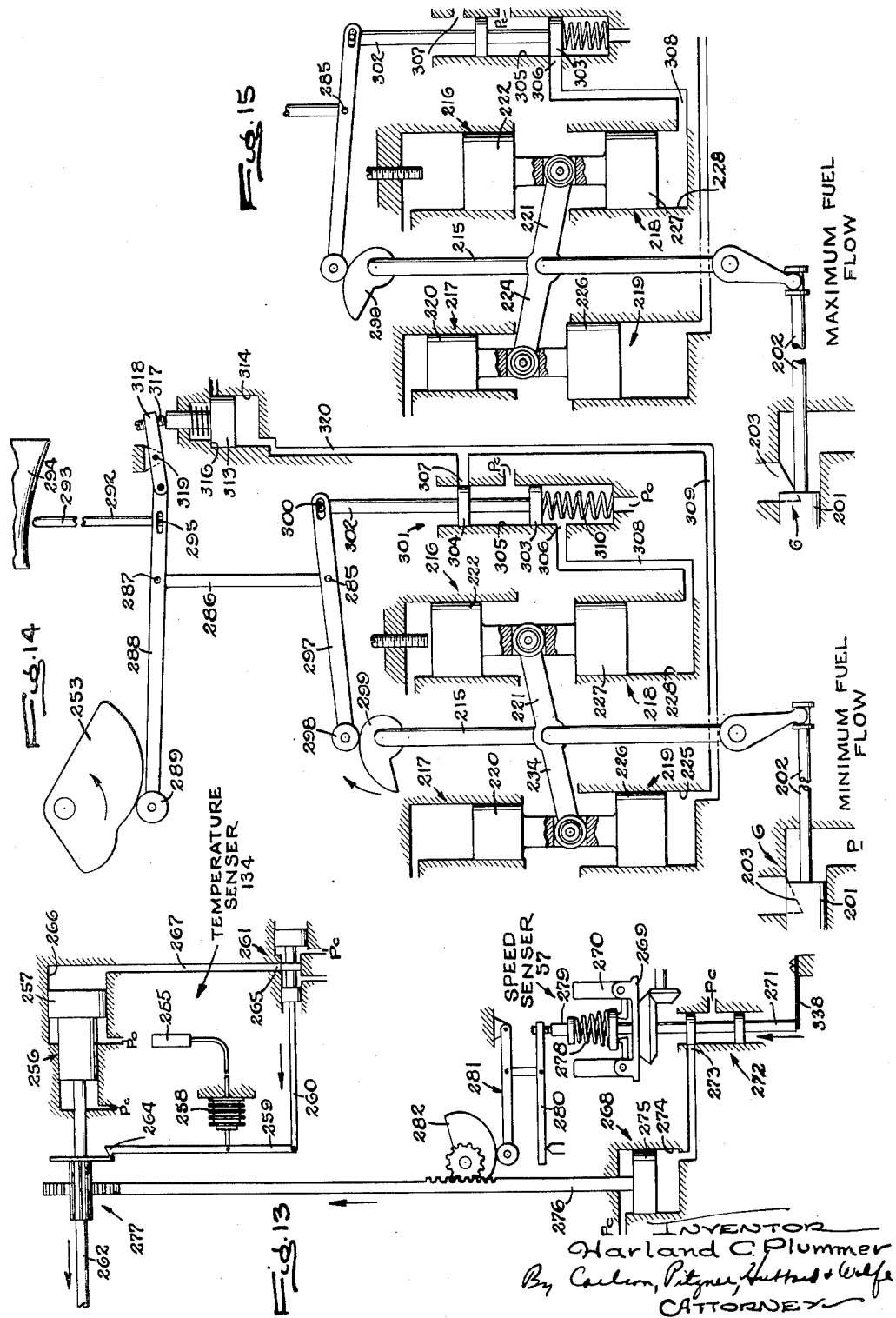

Feb. 6, 1962 H. C. PLUMMER 3,019,602
SPEED REGULATOR FOR PRIME MOVERS
Filed May 6, 1957 8 Sheets-Sheet 8
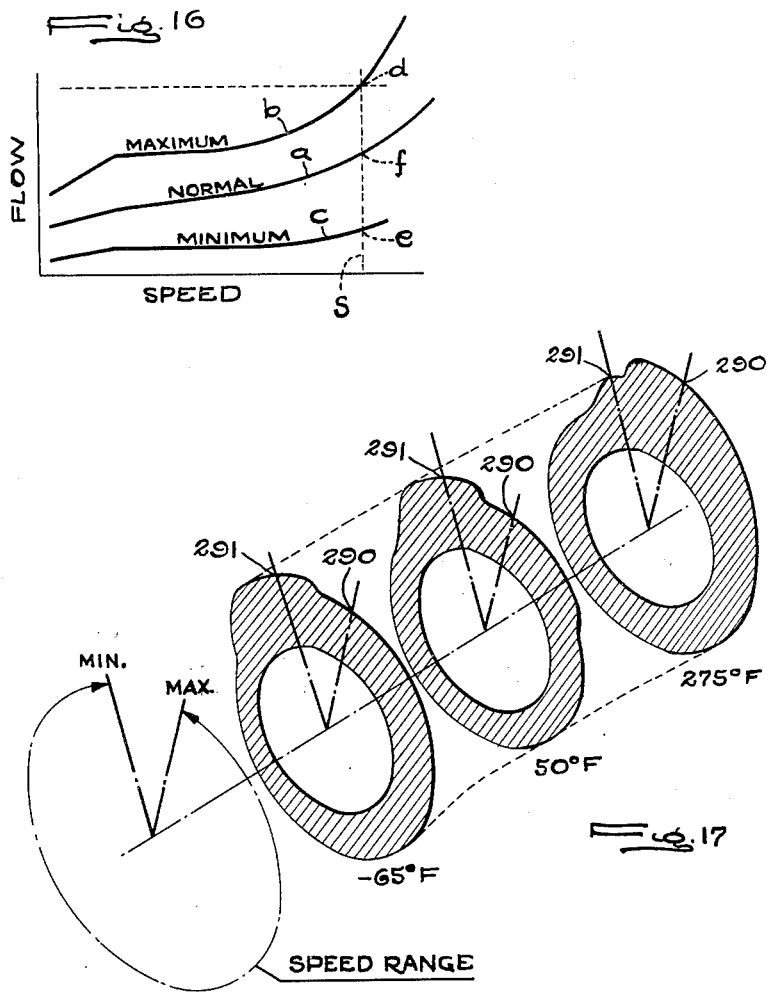
INVENTOR
Harland C. Plummer
By Carlson, Pitzner, Hubbard & Wolfe
ATTORNEY

United States Patent Office 3,019,602
Patented Feb. 6, 1962

3,019,602
SPEED REGULATOR FOR PRIME MOVERS
Harland C. Plummer, Rockford, Ill., assignor to Woodward Governor Company, Rockford, Ill., a corporation of Illinois
Filed May 6, 1957, Ser. No. 657,291
21 Claims. (Cl. 60—39.29)

This invention relates to a system for metering the flow of fuel to a prime mover such as a gas turbine to regulate the speed thereof under the varying conditions encountered in the service use. The invention has more particular reference to system of the type in which positioning of the fuel valve is effected primarily by the action of a selectively adjustable governor responsive to the engine speed and secondarily by a mechanism which imposes a supervisory effect under certain conditions.

The general object is to provide a speed regulator of the above character which is more versatile than prior systems in producing different desired operating characteristics of the prime mover under abnormal as well as normal conditions.

Another object is to provide apparatus which is simpler, and more reliable and accurate than prior controls, in establishing a desired value of fuel flow in response to ambient or other conditions affecting the operation of the prime mover and while disabling or overriding the primary speed controller when such desired flow rate is reached.

A further object is to utilize a plurality of interconnected fluid servos in a novel manner in transferring the regulation of the fuel flow back and forth between the primary and limit controllers.

Still another object is to provide a novel and reliably operable computing mechanism determining the limit fuel flows in response to a plurality of engine operating conditions.

The invention also resides in the provision of various mechanisms for modifying the action of the primary and limit controllers to accommodate special operation conditions encountered in the operation of gas turbines.

Other objects and advantages of the invention will become apparent from the following detailed description taken in connection with the accompanying drawings, in which FIGURE 1 is a diagrammatic view of a reaction-type prime mover equipped with a governor control embodying the novel features of the present invention.

FIG. 2 is a plan view of the governor unit with the cover of the casing removed.

FIG. 3 is a vertical sectional view taken along the line 3—3 of FIG. 2.

FIG. 4 is a fragmentary view showing the shape of the outlet port of the fuel valve.

FIG. 5 is a schematic view of part of the governor control.

FIG. 6 is a schematic view of the remainder or computer part of the control adapted to be connected to the right hand end of FIG. 5.

FIG. 7 is a view similar to FIG. 6 showing the parts in a different position.

FIGS. 8 to 11 are curves showing the relation of engine speed and fuel flow under different conditions, FIG. 11 being an enlargement of the lower part of FIG. 10.

FIG. 12 is a schematic view and hydraulic circuit diagram similar to FIGS. 5 and 6 showing part of a modified and preferred form of the improved speed regulator.

FIG. 13 is a schematic view of the remainder of the control shown in FIG. 12 when placed at the right-hand end of the latter figure.

FIGS. 14 and 15 are similar but fragmentary views showing other positions of the parts.

FIG. 16 is a chart of engine speed-fuel flow characteristics capable of being produced by the improved control.

FIG. 17 is a fragmentary view showing different cross sections of the three-dimensional computer cam.

In the forms shown in the drawings for purposes of illustration, the improved speed regulator especially adapted for metering fuel to a reaction type prime mover or gas turbine engine (FIG. 1) by adjusting a valve 6 (FIG. 5) controlling the flow of liquid fuel under pressure to a passage 7 leading to the burner nozzles 8 of a reaction motor (FIG. 1) having a casing 9 enclosing a rotary compressor 10 and a gas turbine 11 joined by a connecting shaft 12. In motors of this type air delivered by the compressor 10 is admitted to the burners through holes in the burner housings 13.

Fuel valve

In the form shown in FIGS. 1 to 7, the valve 6 and the parts governing its operation are housed within a casing 4 to which a rotary drive connection 3 is extended from a gear on the forward end of the rotor of the compressor 10. Herein, the valve 6 comprises a plunger 15 having spaced lands 16 and 17 slidable in a bore 18 with the end of the land 16 coacting with an outlet port 19 communicating with the passage 7 and generally V-shaped as shown in FIG. 4 so as to effect an approximate percentage change in the flow for each given increment of movement of the valve plunger.

Liquid fuel placed under pressure by the usual booster pump is delivered through a passage 20 to the inlet of a pump 21 (FIGS. 1 and 5) which may be of the gear type and driven at an appropriate speed by the drive connection 3. The pump outlet is connected through a passage 22 to the bore 18 between the lands of the valve plunger 15.

Regulation of fuel metering head

To proportion the fluid flow accurately in accordance with changes in the position of the valve plunger 15, the excess of the fuel delivered by the pump 21 is by-passed back to the pump inlet automatically under the control of the valve 23 which responds to the pressure drop across the main valve 6 and operates automatically in conjunction with a pressure responsive pilot valve 24 to maintain this pressure drop within very close limits. For this purpose, the by-pass valve 23 comprises a land 25 slidable in a bore 26 and cooperating with a port 27 which communicates with a return or by-passage 28 leading to the pump inlet. The pump outlet 22 communicates continuously with the bore 26 at a point between the land 25 and a piston 30 connected to the land by a plunger 31 and also slidable in the bore.

The plunger is urged by a compression spring 32 in a direction to close the by-pass valve 23 and is shifted in the other direction by a servo actuator 33 formed by the piston 30 and the cylinder 26 and variably energized under the control of the pilot valve 24 which is sensitive to changes in the pressure difference between the inlet and outlet passages 22 and 7 of the main fuel valve 6. To this end, the servo cylinder 26 beyond the outer end of the piston 30 communicates through a passage 34 with the port 35 which opens into a cylinder 36 in which slides a plunger 37 having spaced pistons 38 and 39 thereon. Opposite ends of the cylinder 36 are connected through passages 40 and 41 to the main valve passages 7 and 22, the passage 40 preferably including a restriction 42. A passage 43 leads from the intermediate portion of the cylinder 36 to the fluid return line or pump inlet 29.

When the supply pressure acting on the piston 38 just balances the combined forces of compression springs 44 and 182 and the pressure in the fuel delivery passage 7, all of which act on the plunger 37, the piston 38 will be centered and the port 35 will be covered by the piston 38 as shown in FIG. 5. If the supply pressure increases above this value, the plunger 37 will be forced to the right admitting high pressure fluid through the port 35 and the passage 34 to the servo actuator 33 and the increased force thus acting on the piston 30 will force the plunger 31 to the left and by-pass to the pump inlet 29 a greater part of the fuel delivered by the pump 21. Conversely, if the difference between the supply and engine pressures decreases below the desired value, the pilot plunger 37 will be moved to the left uncovering more of the port 35 and permitting fluid to escape from the servo 33 so as to reduce the force on the servo piston 30 and intitiate closure of the valve 23. The amount of the by-pass is thus reduced until the proper pressure differential across the main valve 6 is again attained.

By utilizing the pilot valve 24 in the manner described above, deviations in the pressure drop across the valve 6 from the value desired are sensed independently of the by-pass valve plunger 31 and the energization of the servo 33 is changed correspondingly. Extremely close regulation of the pressure drop across the fuel valve is thus attained so that the rate of fuel flow to the engine always corresponds accurately with the position of the valve member 16.

Variation in the rate of fuel flow to the engine for a given position of the valve 6 may be effected by varying the loading of the pilot valve 24 as by adjusting a cam 97 (FIG. 5) fast on a shaft 98.

To interrupt the flow of fuel whenever desired, a valve 91 (FIG. 5) is interposed in the supply line 7 and arranged to respond to pressure drop across the pump 21. The movable member 92 of the valve is urged toward closed position by a spring 93 and is formed on the inner end of a piston 94 slidable in a cylinder 95 whose rod and head ends communicate with the outlet 22 and the inlet 20 of the pump. When it is desired to shut off fuel the throttle lever is moved to a position so that 183 contacts 37 and thus mechanically displaces 37 independent of spring and hydraulic forces. This causes the valve plunger 31 to be moved to the full open by-pass position. The resultant low pressure across the piston 94 allows the valve 91 to close.

Fuel valve actuator

The fuel valve 6 is actuated by a multiple servo means 45 which in this form of the invention includes a piston 46 fast on the valve member 16 and slidable in the cylinder 47. The piston is constantly urged in the valve closing direction by fluid pressure exerted on a piston 49 smaller than and rigid with the piston 46 and slidable in a cylinder 50 which communicates with a supply line 51. Through a passage 52, the line 51 receives fluid from the pump outlet passage 22 and the pressure, usually about 100 p.s.i., is maintained at a constant value by an automatic regulating valve 53 loaded by a spring 54. The effective area of the lower end of the piston 49 is substantially less than that of the upper end of the piston 46 but the combined areas of the lower ends of the pistons 46 and 49 are greater than the upper area on the piston 46. Thus, the upper ends of the piston 46 and the cylinder 47 form a main fluid servo while the lower ends form a secondary servo which may be energized to supplement the biasing force on the piston 49 and override the main servo. As a result, the fuel valve is moved back and forth in the direction of the resultant force exerted by the several servos.

Movement of the valve in the closing direction is limited by engagement of the outer end of the valve stem 15 and a stop 15ᵃ which is adjusted to establish a desired minimum rate of fuel flow to the engine. Herein, the stop is on a screw 15ᵇ threaded through a part of the casing 4.

Fuel control in general

For any given combination of operating conditions and over a relatively wide permissible range of such conditions, the fuel flow during a relatively wide but safe speed range is regulated solely by the action of a primary controller or governor 56 responsive to changes in the prime mover speed and adjustable as by a manually operable selector 58 for maintaining different speeds. This governor regulates the energizataion of the main servo above referred to and is preferably of the so-called isochronous type and thus compensates automatically for the numerous minor variations in engine characteristics and operating conditions which would otherwise be conducive to instability or off peak operation.

In accordance with the present invention, the secondary servo above referred to comes into play automatically whenever the flow of fuel as determined by the action of the speed governor 56 deviates from a value which is permissible or safe under the prevailing engine operating conditions. In the present instance, the safe limit is computed as a resultant of engine speed measured by a speed sensor or tachometer 57 and air density determined by a device 155 (FIG. 6) sensitive to inlet air temperature and a device 136 sensitive to changes in the pressure of the air delivered to the compressor 10 or to the burner 8. The permissible and limiting fuel flow thus computed is applied to a valve 111 governing the energization of the secondary servo which is adapted to either limit or override the main servo and thus impose the desired supervisory control on the primary governor 56 and its hand lever adjuster 58.

Primary governor—adjustment and control thereby

As illustrated herein, the main governor 56 may be of the construction of which is disclosed in Patent 2,478,-753 which may be referred to for further details. The speed sensor of the governor comprises a pair of flyweights 60 pivoted at 61 on a head in the form of a gear 62 which is fast on the upper end of a ported sleeve 63 rotatable in a bushing 64 which is supported in the casing 4. A gear 65 at the lower end of the bushing 63 is connected through suitable gearing with a coupling element 65ᵃ which interfits with a part of the pump 21 so that the ball head is rotated in unison with the compressor 10.

The centrifugal force acting on the flyweights is balanced against a compression spring 68 bearing downwardly against the inner race of a ball thrust bearing 69 whose outer race is engaged by arms 70 on the flyweights. The speed setting of the governor is adjusted by manually turning a shaft 71 journaled in and projecting outwardly from the casing 4 and carrying the selector 58 which takes the form of an arm disposed externally of the casing. A cam 72 fast on the shaft acts on a follower in the form of a slidable plunger 73ᵃ bearing at its other end against one end of a lever 74 fulcrumed intermediate its ends on a pivot 74ᵃ. The other end of the lever bears downwardly against a plunger 73 slidable in a bore 73ᵇ in the casing 4, the lower end of this plunger forming an abutment for the upper end of the speeder spring 68. The latter is compressed and extended as the selector 58 is turned counterclockwise and clockwise respectively thus correspondingly increasing and decreasing the speed setting of the governor 56. The extent of compression of the spring 68 to increase the engine speed is limited by the high point 72ᵃ of the cam 72 and the position of the fulcrum 74ᵃ which is carried by a screw 74ᵇ and is adjustable in the casing 4 to vary the maximum engine speed obtainable by adjustment of the selector 58.

The control force derived from changes in the flyweight speed is, in the present instance, applied to the plunger 75 of a pilot valve 76 formed by a port 77 coacting with a land 78 on the plunger. The latter is slidable in the sleeve 63 and is connected at its upper end to the inner race of the bearing 69. Below the land 78, the sleeve communicates with a drain passage. Through a groove in the bushing 64 and a hole 79 in the sleeve 63, the pressure fluid supply line 51 communicates continuously with the space above the valve land 78. The outlet port 77 is connected to a space 80 communicating with one end of a cylinder 81 having a piston 82 slidable therein and urged toward a centered position by compression springs 83 and 84. The other end of the cylinder communicates through a passage 85 with the upper end of the servo cylinder 47 so that pressure fluctuations in the space to which fluid is delivered to or from which it is released when the valve 76 is open are communicated to the top of the servo piston 46 through the intermediary of the piston 82.

The so-called compensating system for producing isochronous operation of the governor 56 includes a wall or piston 87 fast on the valve stem 75 and reciprocable in a cylinder 86 formed in the sleeve 63 and connected at its lower end to a passage leading to the valve controlled space 80. A passage 88 extends from the upper end of the cylinder 86 to the passage 85 and therefore the servo cylinder 47. A by-passage 89 having a needle valve 90 therein permits slow leakage of fluid between the passages 80 and 88.

In operation, when the land 78, in response to a speed decrease below the prevailing speed setting of the governor, is lowered from its neutral position opening the port 77, pressure fluid will flow into the passage 80. The pressure increase moves the piston 82 to the right compressing the spring 84 and forcing fluid out of the remote end of the cylinder 81 into the servo cylinder 47. The servo piston 46 is thus moved downwardly in the speed increasing direction against constant fluid pressure on its lower end. Conversely, a detected rise in speed causes the valve land to be raised above the port 77 allowing fluid to escape to the sump thus decreasing the pressure in the passage 80. This allows the piston 82 to move under the higher pressure existing in the servo cylinder 47 thereby compressing the spring 83 and allowing the servo piston to move upwardly in the speed decreasing direction.

In response to either of the correcting actions above described a pressure difference develops between the valve controlled passage 80 and the servo passage 85, the differentials being in opposite senses depending on whether the speed rises above or falls below the governor setting. The compensating system above described utilizes these pressure differentials to derive a force acting on the compensating piston 87 in a direction to restore the valve stem to its neutral position. This drooping characteristic is then dissipated gradually through the restriction 90 until normal speed has been restored under the changed load as is set forth more fully in the aforementioned patent. The action results in the fuel valve taking a new position without a permanent change in the engine speed.

*Fuel limit control*

The prevailing values of engine speed, air temperature and air pressure may be measured and combined in various ways and the computed resultant utilized to position the valve 111 and impose the fuel flow limit on the main valve actuator. In the form shown in FIGS. 1 to 7, the speed sensor 57 is associated directly with the valve 111 and the temperature and pressure signals are transmitted through a mechanical computer and utilized to vary the adjustment of the speeder spring of the speed sensor.

*Speed sensor*

This device includes flyweights 100 pivoted on a ball head 101 on the upper end of a ported sleeve 102 which is journaled in a bushing 103 in the casing 4. Gear teeth around the periphery of the head 101 mesh with the gear 62 of the main governor 56. The toes of the flyweights bear upwardly against the lower race of a bearing 104 and the flyweight force is balanced against that of a compression type speeder spring 105 having one part $105^a$ acting between the bearing 104 and a cup-shaped abutment 106 slidable along an axially shiftable adjusting rod 107. A second and weaker part of the speeder spring comprises a coil $105^b$ acting between the abutment 106 and a shoulder 109 on the adjusting rod, the shoulder being engageable with the cup 106 after a predetermined compression of the spring 105. Thus, downward movement of the rod 107 results in compression of the lighter spring $105^b$ until the shoulder 109 engages the cup 106. Thereafter, the stiffer spring $105^a$ alone is compressed in the further downward or speed increasing movement of the adjusting rod. The two springs opposing the flyweights thus coact in a manner to be described more in detail to cause the fuel valve to move at a faster rate with respect to the speed setting in the lower part of the operating range.

The control force derived from the flyballs 100 is applied to the plunger 110 of the pilot valve 111 whose land 112 coacts with a port 113 in the sleeve 102 disposed below a port 114 through which pressure fluid from the line 51 is admitted to the sleeve. The plunger is slidable in the sleeve and is connected at its upper end to the bearing 104. Below the land 112 the sleeve communicates with the drain or low pressure line 28. The port 113 communicates through a groove in the bushing 103 with a passage 115 leading to the lower end of the cylinder 47.

The speed adjuster 107 is coupled to the valve stem 110 through a one-way connection comprising abutments 108 and $108^a$. When the engine is running below about 2800 r.p.m. which is somewhat below the idle speed of about 4000 r.p.m., the abutments engage and the springs $105^a$ and $105^b$ will be inoperative. At higher engine speeds, the abutments separate as shown in FIG. 5 and the compound speeder spring 105 is effective to a degree determined by the prevailing temperature and pressure conditions.

In operation, as the engine speed increases above the prevailing speed setting determined by the loading of the spring 105 by the speed adjuster 107, the land 112 is raised above the port 113 permitting fluid to escape from the cylinder 47 and reducing the upwardly acting force applied to the piston 46. Conversely, a speed decrease below the prevailing setting permits the land 112 to be lowered by the speed spring thereby admitting pressure fluid to the cylinder 47 to increase the force on the piston 46.

To enable the speed sensor to limit the maximum fuel flow through the valve 6 while establishing different maximum flow rates for different engine speeds and fuel flows, means is provided for transmitting the movement of the fuel valve 6 produced by either the main or the secondary servos back to the speed adjusting mechanism of the speed sensor 57 in a manner such as to increase the speed setting progressively as the valve is opened. Herein, this means comprises a horizontal lever 116 fulcrumed intermediate its ends on a roller 117 and pivoted at 118 on the speed adjusting plunger 107. A roller 119 on the opposite end of the lever bears against one end of a short lever 120 swingable on a fulcrum 121 fixed to the casing 4. The other end of this lever is pivotally connected at 122 to the projecting end of the fuel valve stem 15.

With this arrangement, closing of the valve port 19 rocks the lever 120 clockwise allowing the lever 116 to swing counterclockwise thus reducing the stress of the speeder spring 105 and correspondingly reducing the speed setting of the speed sensor 57, that is, the engine speed at which the valve 111 is closed. Conversely the valve opening movement of the valve servo 45 is transmitted to the spring 105 in a direction to increase the spring stress and therefore the governor speed setting.

Fuel rate change according to altitude and temperature

In the operation of prime movers of the reaction type, the amount of fuel required in order to maintain a given engine speed decreases with the air density or altitude. Also, as the air density decreases, it is necessary to reduce the maximum allowable fuel flow rate. This characteristic is illustrated in FIG. 8 wherein the amounts of fuel required to maintain different steady state speeds are shown in full for different altitudes while the maximum allowable fuel flows corresponding to such altitudes are shown in phantom. It will be noted that the slope of the curves decreases as the altitude increases.

Also, the maximum amount of fuel capable of being consumed by such a prime mover without exceeding the desired maximum temperature at the turbine blades 14 increases as the temperature of the air within the engine diffuser decreases. This is illustrated by the curves 123 shown in FIG. 9.

The desired modification of the speed sensor action to produce the characteristics shown in FIGS. 8 and 9 is achieved in the present instance by shifting the fulcrum 117 of the lever 116 to change the effective leverage ratio of the lever and also to vary the fuel valve position. More particularly, in response to an increase in altitude or temperature or both, the fulcrum roller is shifted to the left as viewed in FIG. 5 thus decreasing the leverage ratio. In the same movement of the roller, a stationary cam surface 125 shifts the roller downwardly thus immediately increasing the force of the speed spring 105 and, through the action of the governor 57, closing the fuel valve 6 if the latter is then near the maximum allowable opening for the prevailing engine speed.

The cam surface 125 is on a block stationarily mounted at 126 on the casing 4 in a position to form a backing for the roller 117 which is mounted on one end of a link 127 whose other end is pivoted on the upstanding arm of a bell crank lever 128. The latter is fast on a shaft 129 adapted to be rocked by a power actuated servo 130 comprising in this instance a piston 131 urged in one direction by a spring 132 and slidable in a cylinder 133 to which pressure fluid is admitted to swing the bell crank in the opposite direction and move the fulcrum roller 117 to the left.

The energization of the servo 130 is regulated by the combined action of devices 134 and 135 for sensing temperature and pressure changes in the air as admitted to the inlet of the engine compressor 10. Herein, the pressure senser includes bellows 136 secured at one end to a frame 137 in the governor casing 4 and communicating through a tube 138 with the inlet end or diffuser of the motor housing 9. The other end is attached to a slide 140 which is connected to one end of an evacuated bellows 141 expanded by a spring 142 and adjustably supported at its other end by a screw 143. The slide carries a roller 144 bearing against one end of a floating lever 145 to communicate the movements of the bellows 136 with pressure changes to a pilot valve 146 controlling the energization of the servo 130. The other end of the lever is pivotally connected to the valve stem 147 having lands 148 and 149 slidable in a bushing 150 rotatably supported in the casing 4. A spring 151 urges the lever 145 clockwise about the roller 144 as a fulcrum toward a limit position determined by a stop 151ª. Through a passage 152, pressure fluid from the constant pressure line 51 is supplied to the bushing 150 between the lands. The land 149 cooperates with a port 153 joined by a passage 154 to the servo cylinder 133.

In the form shown, the temperature sensing device 134 comprises a bulb 155 disposed in the inlet of the compressor 10 and connected through the usual capillary tube 156 with a bellows 157 mounted within the governor case 4 with its free end bearing against the horizontally projecting arm of an L-shaped bell crank 158 swingable on a fixed pivot 159. The bell crank is urged in a clockwise direction by a compression spring 160. A pivotal and sliding connection 161 joins the depending arm of the bell crank 158 with the intermediate portion of the straight lever 162 fixedly pivoted at 163 at its lower end. A roller 164 mounted on the upper end of the lever 162 provides a fulcrum for a lever 165 which forms part of a power actuated follow-up mechanism for restoring the pilot valve 146 to neutral after a change in temperature or pressure.

The lever 165 is pivotally connected at 166 on the upper end of a vertical link 167 whose lower end is pivoted at 174 on the valve actuating lever 145. At its other end, the lever 165 carries a roller 168 which is the follower of a follow up cam 169 fast on a shaft 170 which is journaled in the governor case and joined to the servo shaft 129 through speed reduction gearing 171. The pivot 166 is guided for vertical movement by virtue of its connection with the free end of a link 172 the other end of which is fixedly pivoted at 173.

Computer operation

The pressure and temperature sensitive computer above described operates as follows assuming the parts to be at equilibrium as shown in FIG. 6. If the engine inlet pressure decreases, the bellows 136 will collapse rocking the lever 145 about the pivot 174 and lowering the valve stem 147. Pressure fluid from the line 152 is admitted to the servo cylinder 133. The resulting counterclockwise rocking of the shaft 129 shifts the fulcrum roller 117 to the left. Through the gears 171, this same motion is transmitted clockwise to the cam 169 thus rocking the lever 165 about the fulcrum 164 to raise the link 167. The lever 145 is thus swung about the roller 144 as a fulcrum raising the pilot valve stem until the latter is again recentered relative to the port 153. As a result, the leftward motion of the fulcrum roller is proportioned accurately in accordance with the detected drop in pressure. Conversely, a rise in the ambient pressure causes raising of the valve stem thus allowing fluid to drain from the servo cylinder 133 until equilibrium has been restored by the follow-up mechanism. In this case, the roller 117 is moved to the right a distance proportional to the pressure increase.

Similar movements of the fulcrum roller are produced by the servo 130 in response to rises and falls in the ambient temperature. For example, a temperature increase causes counterclockwise rocking of the bell crank 158 and shifting of the roller 164 to the right as shown in FIG. 7. This allows the lever 165 and the link 167 to be lowered under the action of the spring 151 thereby lowering the valve land 149 to admit pressure fluid to the servo 130. The energization of the latter is increased and the roller 117 is moved to the left until the accompanying turning of the cam 169 has restored the valve to neutral. Conversely, a decrease in ambient temperature shifts the roller 162 to the left camming the lever 165 upwardly and raising the pilot valve stem to allow fluid to drain from the servo 130 thereby shifting the fulcrum 117 to the right a corresponding amount.

Variable idle speed schedule

Provision is made for limiting the speed to which the pilot may retard the engine by mainpulating the selector 58, this value being referred to as the idle speed which may be defined as the minimum speed from which the engine will accelerate. Usually this speed is about 4000 r.p.m. at sea level. Since this idle speed is affected by the same conditions of pressure and temperature as the maximum permissible fuel rate, the computer above described is utilized to perform the additional function of imposing proper limitations on the manual adjustment of the main governor 56. Generally stated, this is achieved through the use of a stop 175 which limits the expansion of the speeder spring 68 to the desired idle speed setting and which is shiftable by movement of the computer servo 130 so as to increase the idle speed setting progressively with increases in altitude and ambient temperature.

For this purpose, the connection between the throttle arm 58 and the abutment plunger 73 of the speeder spring 68 is formed by separable parts 73 and 74 and the stop 175 is adjusted along the spring axis with changes in the position of the servo 130. Herein, the stop is formed by the free end of a lever 176 (FIG. 5) and projects into a slot in the plunger 73 defined between a roller 190 and an abutment 191. The lever is pivoted intermediate its ends on a fulcrum 177 which is carried by a screw 178 threaded into the casing 4 so as to permit adjustment of the fulcrum in a direction parallel to the axis of the speeder spring 68. At its opposite end, the lever 176 carries a follower roller 179 whose downward movement is limited by engagement with the periphery of a cam 180 fast on the computer shaft 129 and shaped to provide the desired idle speed schedule.

As the altitude or temperature or both increase and the shaft 129 is turned counterclockwise, the position of engagement between the follower 179 and the cam is raised progressively and the stop 175 is lowered correspondingly. The minimum expansion of the speeder spring as determined by engagement of the roller 190 with the stop 175 is reduced and therefore the lowest permissible speed setting is increased irrespective of the position of the selector 58. The latter may however be turned to higher speed settings as permitted by movement of the follower 179 away from the cam 180. As a result, the pilot may at any time adjust the setting of the speeder spring 68 to any value above the idle speed value determined by the prevailing ambient temperature and pressure.

*Altitude starting*

As described above the minimum closing of the fuel valve 6 is limited by the position of the stop 15ᵃ (FIG. 5) which is usually adjusted for normal operation at low altitudes. At low engine speeds and when the airplane is traveling at high altitude, this rate of flow may be excessive and cause overheating of the turbine parts. Such a condition arises when it becomes necessary to start the engine while flying at high altitude.

To take care of this abnormal condition, provision is made for reducing the pressure drop automatically maintained across the fuel valve 6 progressively as the throttle arm 58 is turned in the speed decreasing direction below the prevailing idle speed setting as determined by the position of the stop 175. For this purpose, this movement of the speed selector 58 is utilized to increase the loading imposed on the pressure sensing pilot valve 24 by a spring 182 (FIG. 5) acting in opposition to the main loading spring 44 of this valve. Herein, the spring 182 is of the compression type and is arranged within the cylinder 36 with one end abutting against the land 38 and the other end engageable with an abutment 183 on a rod 184 which projects through the end of the cylinder 36 for engagement with the end of the screw 185 threaded through the free end of an arm 186. The latter is fast on the throttle shaft 71 and positioned for engagement of the screw 185 with the end of a rod 184 when the throttle, in moving in the speed decreasing direction, moves beyond a predetermined position corresponding approximately to the idle speed setting for sea level operation. In this movement, the abutment 183 is moved away from its normal position against the cylinder end and the force of the spring 182 is increased thus reducing the resultant leftward force on the plunger 37 by which force the maintained supply pressure is determined. The pressure drop across the valve 6 is reduced correspondingly thereby decreasing the amount of fuel which flows through the valve at any plunger position.

The amount of the decrease in the supply pressure increases as the throttle shaft 71 is turned further in the clockwise direction. In this way, the pilot may, by proper manipulation of the throttle, select the fuel rate best suited for safe starting of the engine at any altitude.

*Operation of controller (FIGS. 1 to 7)*

When the engine is stopped, the flyweights of the governor 56 are swung inwardly by spring 68, thus lowering land 78 below the port 77. During this condition the speed setter 107 and the valve 110 of governor 57 are effectively linked together by the action of the preload in springs 105ᵃ and 105ᵇ, holding the abutments 108 and 108ᵃ in contact. As soon as rotation is started, flyweight force and fuel pressure cause the fuel valve 6 to move to its required position as described below.

To start the engine, the hand lever 58 is moved to any position above the idle setting, the starter is energized, and the ignition is turned on. The pump 21 delivers fuel along line 188 (FIG. 11). The combination of burner nozzle 8 (FIG. 1) restriction and normal control pressure regulation causes the fuel pressure to rise. During this condition, the temperature and pressure sensors assume fixed positions corresponding to the inlet air conditions. As the engine accelerates, following ignition, the fuel is scheduled as follows. Pressure fluid is admitted to the lower end of the piston 49 and to the upper end of the piston 46 inasmuch as the land 78 is below the port 77. The resulting force acting on the valve member 16 moves the latter downwardly to open the valve 6 until the valve movement transmitted through the lever 116, and the speed setter 107 directly to the valve stem 110 thus lowers the land 112 to cover the port 113 as indicated at 192 (FIG. 11). This blocks further draining of fluid from the cylinder 47. The position of the valve 6 remains fixed as the engine accelerates along 193 until, at 194 the flyweights 100 develop enough force to overcome the initial preloading of the spring 105 thus separating the abutments 108ᵃ and 108ᵇ and lifting the land 112 above the port 113.

Under the action of the lighter spring 105ᵇ, the fluid is permitted to drain from the lower end of the cylinder 47 and the pressure in the upper end of the latter causes valve 6 to open quite rapidly as the engine speed increases as indicated at 195. In this action, the rod 107 is moved downwardly against the action of the spring 105ᵇ to correlate the valve opening with the engine speed increase. Finally, at 201ᵃ, the shoulder 109 encounters the cup 106 and thereafter the fuel limiting action of the governor 57 is regulated by the spring 105ᵃ alone. The fuel flow thus increases along the maximum limit curve 196 as the speed of the engine increases. That is to say, flyweights 100 move outwardly permitting drainage of fluid from the lower end of the servo cylinder 47 thus allowing further opening of the fuel valve 6 under the predominating force on the upper end of the servo piston. This valve motion is transmitted to the speeder spring 105ᵃ which is further compressed with the result that the governor 57 remains in control of the servo and limits the rate of fuel increase upwardly along the curve 196 as indicated at 197 as the engine speed increases.

Finally, when at 198 (FIG. 10) the engine speed reaches the value corresponding to the selected setting of the throttle lever 58, the control of the fuel valve servo is transferred to the main governor 56 which interrupts the fuel increase. That is to say, at or slightly above the selected speed, the flyweights 60 raise the land 78 above the port 77 thus relieving the pressure on the upper end of the servo piston 46 so that the valve 6 starts to close along the line 199 under the constant force on the piston 49. At this time, the flyballs 100 are swung outwardly under the decreased compression of the spring 105ᵃ thus releasing fluid from the lower end of the servo cylinder so that the position of the valve is determined by the action of the main governor alone in adjusting the pressure in the upper end of the servo cylinder.

After equilibrium indicated at 202ᵃ has been established at the engine speed selected by positioning of the throttle lever 58, the governor 56 operates automatically to vary the servo energization and vary the fuel flow along the steady state curve 200ᵃ to maintain the engine speed constant. Whenever the engine speed corresponds to the throttle setting, the rate of fuel flow will always be well below the maximum permissible rate as determined by the prevailing speed, temperature and pressure sensers and applied to the valve 111 which maintains the limit servo ineffectual. This condition obtains during changes in the throttle position provided such changes are made at a rate slow enough for the engine speed to respond to the changed rate of fuel flow. However, if the throttle setting is increased rapidly to a value requiring a fuel flow above the maximum limit corresponding to the then prevailing engine speed, the fuel valve will be opened quickly by the action of the main governor resulting in a corresponding compression of the speeder spring 105ᵃ. This brings the limit control back into action by lowering of its land 112 to admit pressure fluid to the lower end of the servo cylinder 47 and thus overcome the pressure on the upper end of the piston. As a result, the increase in fuel flow along the curve 196 is limited and follows the acceleration of the engine. By this limiting action, all danger of overheating of the engine parts is avoided and the pilot, in changing engine speed, is not required to adjust the throttle 58 according to a predetermined schedule.

Referring to FIG. 11, it will be observed that the fuel flow to the engine is maintained at a fixed rate as described above and shown by line 193 until the engine has attained some pre-selected speed; for example 3000 r.p.m., corresponding to point 194. When the flyweights 100 exert a force sufficient to overcome the preload on the springs 105ᵃ and 105ᵇ, the fuel valve 6 will progressively open as the speed increases and fuel will be scheduled along line 195. The nature of this schedule, assuming that the position of the roller 117 is fixed, is dependent upon the combined action of springs 105ᵃ and 105ᵇ. When the length of the spring 105ᵇ has been shortened so that abutments 106 and 109 contact each other, spring 105ᵇ is rendered ineffective and the nature of the schedule from point 201 along line 196 will no longer be influenced by spring 105ᵇ.

The computer servo 130 operates as above described in response to ambient temperature and pressure changes to shift the fulcrum roller 117 back and forth along the lever 116 and the cam 125 to raise and lower the maximum fuel limit curve as shown in FIGS. 8 and 9. For example, as the air density decreases, the servo 130 shifts the fulcrum 117 to the left as viewed in FIG. 5 which results in a change in the effective ratio of the lever 116 as well as forcing the fuel valve toward closed position thus reducing the fuel flow.

At any time, the reduction in the speed setting of the governor 56 that may be effected by manual adjustment of the throttle 58 is limited by the stop 175, thus preventing the engine speed from being reduced to a value insufficient to maintain continued operation of the engine. Since this value varies with changes in altitude, the position of the stop is adjusted by the computer in accordance with variations in temperature and pressure.

When it is desired to stop the engine, it is only necessary to turn the throttle clockwise to the cut-off position. The rod 184 thus shifts the pilot valve plunger 37 to the right thereby admitting full pressure to the piston 30 which shifts the plunger 31 to full by-passing position. The flow of fuel to the engine is thus interrupted.

*Modified speed regulator*

FIGS. 12 to 16 show the improved speed regulator in a modified form which is preferred because of its versatility in producing a wider variety of different engine operating characteristics as well as numerous ancillary functions contributing to improved safety and efficiency of operation under abnormal conditions frequently encountered in service use in aircraft gas turbines. As in the regulator first described, the valve 6 for metering fuel to the prime mover is actuated by a multiple hydraulic servo 45 under the primary control of a main speed governor 56 which operates within limits determined by the prevailing values of engine speed detected by speed senser 57, an air temperature senser 134, and an air pressure senser 135. The prime mover speed maintained by the governor within a normal range between curves $b$ and $c$ (FIG. 16) is adjustable selectively as by the hand lever 58, and the supervisory control operates to override the speed governor and limit, either to a maximum $b$ or minimum $c$, the rate of fuel flow to the engine or to independently increase or decrease the fuel flow when the latter rises above the prevailing computed maximum or falls below the computed minimum.

The fuel valve and all of the parts of the control except the extensions to the temperature and pressure sensing devices are submerged in fuel within a casing indicated by the hatching and preferably mounted on the frame of the prime mover to be controlled. The configuration of the various parts shown herein is, of course, changed to facilitate such enclosure and assembly into a compact unit suitable for proper mounting on and for connection with the various parts of the prime mover.

The arrows on FIGS. 12 and 13 indicate the directions of motions resulting from increases in the values of the conditions represented. Thus, the plunger 75 of the governor pilot valve moves upwardly in response to the detection of an increase in the engine speed by the governor 56. The pressures maintained in different interconnected parts of the system are indicated by the same reference characters including P, Pc, and Po. P, the pressure of the fuel delivered by the pump 21, usually 150–1000 p.s.i., Pc, the pressure (125–150 p.s.i.) maintained by the automatic valve 53 to supply the various hydraulic servos, and Po, the drain or low pressure within the controller casing (usually less than 50 p.s.i.).

The pressure regulating valve 53 and the governor 56 are of the same construction as in the controller first described, the same reference numbers being applied to corresponding parts.

*Regulation of fuel flow*

The fuel valve 6 comprises an elongated cylinder 200 communicating at one end with the outlet of the engine driven pump 21 which delivers fuel at a pressure P. The movable member 201 on an outwardly projecting stem 202 is slidable in one end portion of the cylinder to vary the uncovering of an outlet port 203 from which the fuel is delivered to the burners of the engine through a pipe 204. The port is elongated and triangular in shape or otherwise tapered to increase the flow rate progressively as the valve is opened.

Provision is made for maintaining a constant pressure drop across the valve 6 so as to proportion the flow precisely according to the position of the valve member. To this end, a piston 205 slidable in the other end of a cylinder 200 is urged by a spring 206 in a direction to close an outlet 207 disposed intermediate the cylinder ends and adapted when uncovered to by-pass fuel to a return line at the reduced pressure Po. The force of the spring is supplemented by fluid pressure supplied under the control of a valve 208 whose plunger 213 carries a piston 209 slidable in a cylinder 209ᵃ communicating at opposite ends through passages 210 and 211 with the fuel supply pipe 204 leading to the engine end of the main pump 21.

When the pressure difference between the inlet and outlet of the valve 6 falls below a value predetermined by an adjustable compression spring 212, the plunger 213 will move downwardly to admit fluid at the pressure P behind the piston 205 thus increasing the loading thereof. The area of the by-pass outlet 207 is thus reduced until the desired differential drop across the port 203 is restored. Conversely, a rise in this pressure differential shifts the plunger 213 upwardly releasing fluid from behind the piston 205 to open the port and by-pass more of the fluid delivered through the main line. As a result, a constant pressure drop is maintained across the valve 6 irrespective of the degree of opening thereof.

*Multiple servo valve actuator*

In the present instance, the stem 202 of the fuel valve 6 is actuated as through a crank 214 by a shaft 215 journaled in the governor housing and adapted to be oscillated back and forth by the joint action of a plurality of servos 216, 217, 218 and 219 corresponding to the actuator 45 in the form first described and preferably separated from each other. Each of these servos comprises a piston slidable in a cylinder communicating at its rod end with a return line at the pressure Po. The servo 217 applies a substantially constant force biasing the valve member 201 in the closing direction. To this end, fluid at the control pressure Pc is supplied continuously to the head end of the servo cylinder whose piston 220 has an end bearing against a roller on one end of an arm 221 fast on the shaft 215.

The main servo 216 acts in opposition to the biasing force of the servo 217 and its piston 222 is substantially larger in area than the piston 220 of the biasing servo. The piston 222 slides in a cylinder 223 and bears against a roller on the free end of an arm 224 also fast on the shaft 215. The servo 219 also acts in opposition to the biasing servo and in the same direction as the servo 216. It comprises a cylinder 225 and a piston 226 therein of the same area as the piston 222 and bearing at one end against the free end of the arm 221 on the side thereof opposite the piston 220. The piston 227 of the servo 218 is similarly sized and bears against the other end of the arm 224 so that the pressure of fluid admitted to the head end of the servo cylinder 228 will supplement the force exerted by the biasing servo. Springs 229 urge the pistons 226 and 227 continuously against the ends of the arms 221 and 224.

As previously described, the primary governor 56 is of the isochronous type and operates when the engine is on-speed to maintain the servo 216 energized to a degree that balances the force of the servo 217, the position of the valve member 201 and the flow of fuel to the engine remaining fixed. In response to the detection of a speed increase above the setting of the speeder spring 68, the valve plunger 75 is raised from the position shown in FIG. 12 thus releasing fluid from the servo 216 and allowing the biasing servo 217 to move the valve member 201 in the closing direction. By virtue of the primary and secondary compensating effects exerted on the piston 87 and dissipated by leakage through the valve 90, the change in the fuel flow is correlated closely with the detected speed change which is compensated for quickly and accurately.

By similar action, the fuel flow is increased in accurately measured increments to correct for detected decreases in the engine speed. In such a case, the plunger 75 is lowered from the centered position shown in FIG. 12 thus admitting fluid at the pressure Pc to the head end of the servo 216 to shift the piston 222 and open the valve 6 against the force of the biasing servo.

The governor thus acts automatically in response to detected speed changes to vary the position of the piston 222 and thereby open and close the fuel valve 6 to maintain the engine speed constant. This speed may of course be varied as desired by adjusting the flyweight balancing force exerted by the speeder spring 68 as determined by the position of the manually adjustable control lever 58.

For the purpose to appear later, the motion of the hand lever 58 is transmitted to the speeder spring adjusting rod 230 through a yieldable connection including in this instance a lever 231 fulcrumed at 232 and carrying a leaf spring 233 which bears against a pin 234 slidable in a head on the lever and carrying a roller 234ª which follows a cam 235 rocked by the lever 58. With this arrangement, the lever 231 may, as permitted by a pin and slot connection 236 and yielding of the spring 233, be rocked independently of the hand lever or while the latter remains in fixed position.

*Supervisory control*

To adapt the improved regulator for safe and efficient metering of fuel to an aircraft gas turbine, provision is made for limiting the fuel flow to spaced maximum and minimum values for each different combination of engine speed and air density. Let it be assumed for example that for a given prime mover, it is desirable under varying conditions of air temperature and pressure to maintain a normal relationship between fuel flow and engine speed as indicated by the curve $a$ (FIG. 16) and that the maximum and minimum flows at different speeds are to be limited as indicated by the curves $b$ and $c$ during acceleration and deceleration of the engine. Thus, for any given engine speed $s$, the maximum flow of fuel is limited to a rate $d$ and the minimum flow to the rate $e$. In the range between $d$ and $e$, the flow rate is regulated by the primary or governor control so as to maintain the engine speed constant under different loads at the speed $s$. Accurate control of a gas turbine over such a wide range by the governor alone is made possible by the isochronous character of the governor which compensates automatically for the many variable and transient conditions encountered in the regulation of the speed of an aircraft gas turbine.

To establish such permissible maximum and minimum flow schedules, the devices 134 and 135 are adapted to detect changes in the temperature and pressure of the air consumed by the prime mover and the speed senser 57 is a tachometer for measuring engine speed changes. The three parameters thus measured are converted into corresponding motions which are combined to ascertain the limits of the range through which the fuel flow may be varied by the primary governor control before the supervisory or overriding control becomes effective.

*Pressure senser*

Changes in atmospheric pressure which affect the operation of an aircraft gas turbine may be measured by sensing pressure changes at different points in the air passage leading to the burners 8. In some instances, it is desirable to sense the changes in the pressure P3 in the outlet of the compressor 10 with reference to absolute zero. The device 135 shown herein for accomplishing this includes a passage 240 supplied continuously, through a restriction 241 with fluid at a pressure P1 and communicating with one side of a spring loaded diaphragm 242 whose other side is exposed to the pressure P3 to be measured. A valve 243 actuated by the diaphragm is thus operated to regulate the escape of fluid from the passage 240 so as to maintain P5 at a value corresponding to P3.

Through a valve 244 actuated by a spring loaded evacuated bellows 245, the escape of pressure fluid from a space 246 is regulated to maintain a constant pressure on one end 247 of the plunger 248 of a valve 249. The other end 250 of the plunger is exposed to P5 so that the valve controls the flow of fluid at the pressure Pc to and from hydraulic servo 251 which acts in conjunction with a restoring connection including a feed back spring 252 to position a cam 253 angularly and accurately in accordance with the changing values of the absolute air pressure P3.

*Temperature senser*

In the modified regulator, the temperature senser 134 operates in response to temperature changes of a bulb 255 to vary the energization of a hydraulic servo 256 and move the piston 257 thereof back and forth and maintain the same in a position corresponding to the prevailing temperature of the air supplied to the engine through the compressor inlet or other location of the bulb. Herein, the bulb which is filled with thermosensitive fluid communicates with a bellows 258 whose free end is coupled to a differential lever 259 connected at one end to the stem 260 of a pilot valve 261. The other end of this lever bears at 264 against a disk fast on a shaft 262 which is the rod of the servo piston 257 and is mounted in suitable bearings for rotary as well as endwise movement. The piston motion is thus fed back to the valve plunger 260 by the lever 259 to restore the plunger to centered position following the sensing of each temperature change by the bellows.

In response to an increase in the air temperature, the bellows swings the lever 259 about the fulcrum 264 shifting the valve plunger 260 to the left uncovering the valve port 265 thereby admitting fluid at the pressure Pc to the head end of the servo cylinder 266 through the passage 267 and the valve 261 against the biasing pressure Pc on the small end of the piston 257. Movement of the piston and the shaft 262 is interrupted upon recentering of the valve plunger by the restoring motion transmitted back through the lever 259. Conversely, the valve plunger is moved to the right in response to a detected temperature fall thus permitting fluid to be forced out of the head end of the cylinder 266 under the biasing pressure thereby moving the shaft 262 to the right a distance corresponding to the temperature change.

*Speed senser*

As in the pressure and temperature sensers, the changing values of the engine speed are sensed by the device 57 and utilized to control the energization of a hydraulic servo 268. Herein, this tachometer is of the centrifugal type comprising a ball-head 269 driven through suitable gearing from the engine compressor shaft and carrying fly-weights 270 which act against an abutment on the stem 271 of a valve 272 having spaced lands which straddle a port supplied with fluid at the pressure Pc. When the plunger is raised above the centered position shown, pressure fluid is admitted through a port 273 to the head end of the servo cylinder 274 thus raising the piston 275 therein and a rod 276. The latter is coupled through a rack and pinion 277 to the shaft 262. In response to lowering of the valve land, fluid is forced out of the servo cylinder under the biasing pressure exerted on the rod end of the piston 275.

The fly-ball force is balanced against spring 278 coiled between the plunger and a movable abutment 279 adjustably mounted on a lever 280 in a restoring connection 281 for feeding the movement of the servo piston back to the speeder spring 278. Herein, this connection includes a cam 282 turned through a rack and pinion coupling by the rod 276 and a follower linked to the lever 280.

In response to a rise in the engine speed determined by the prevailing stressing of the speeder spring 278, the valve 272 is opened and the rod 276 is moved upwardly as above described. This motion turns the cam clockwise thus moving the abutment 279 downwardly to compress the spring 278 until the valve plunger has been recentered and the fluid flow to the servo interrupted. Conversely, a speed reduction results in lowering of the end 276 correspondingly reducing the compression of the spring until the valve has been reclosed at the new engine speed. In this way, the shaft 262 is turned back and forth and angularly positioned in accordance with changes in the engine speed which is thus measured accurately.

*Compuation of limit fuel flows*

The endwise and angular movements of the shaft 262 corresponding to the air temperature and engine speed and the angular motion of the cam 253 corresponding to the prevailing air pressure are combined in predetermined ratios to produce a resultant motion of a point 285 which at all times corresponds to the designed maximum or minimum rate of delivery of fuel at the prevailing speed, variations in such maximum or minimum flow rate with changes in engine speed being represented by the curves b and c (FIG. 16). For this purpose, the point 285 is in the present instance on the end of a link 286 whose other end is pivoted at 287 intermediate the ends of a floating lever 288 carrying at one end a roller 289 which constitutes the follower of the cam 253. Near its other end, the lever is pivotally suspended at 295 from the lower end of a rod 292 guided for endwise movement and forming at its upper end a follower 293 of a cam 294 fast on the shaft 262.

Herein, the cam 294 is of the three dimensional type adapted to convert the axial and angular motions of the shaft 262 into a resultant perpendicular motion of the follower 293 whose position at any time corresponds to the logarithm of $Wf/P3$ where $Wf$ is the weight of fuel capable of being consumed efficiently by the prime mover in a unit interval at given values of speed, air temperature, and compressor outlet pressure P3. The cam 253 is shaped to position its follower 289 in accordance with the logarithm of the compressor outlet pressure P3. By properly spacing the point 287 from the followers 289 and 293, the two logarithms are added by the lever 288 which is the equivalent of multiplying $Wf/P3$ and P3. The resultant motion of the point 285 is thus a function of $Wf$ or the maximum fuel flow correct for the speed, temperature and pressure valves corresponding to the points on the cams 253 and 294 being contacted at the time.

FIG. 17 shows cross-sectional contours of the cam 294 at axially spaced sections along its length and therefore at the different temperatures indicated. In each instance, the follower 293 is engageable with the cam surface within a range between points 290 and 291 which correspond to maximum and minimum speeds of the prime mover.

In accordance with one aspect of the present invention, the designed or theoretical fuel flow thus computed is compared with prevailing actual fuel flow to determine the points d and e at which the supervisory controls shall become effective to disable the governor 56 and limit the fuel flow through the valve 6. In the present instance, the comparison is made by a lever 297 pivotally supported intermediate its ends at the point 285 on the link 286 and carrying at one end a roller 298 which rides the periphery of a cam 299 fast on the valve actuating shaft 215 and thus turned back and forth in unison with the valve member 201.

The contour of the cam 299 is determined by the shape of the valve port 203 and is so designed that the follower 298 moves along a line generally parallel to the motion of the point 285 in accordance with the logarithm of the actual flow of fuel through the valve 6. In this way, the other end 300 of the lever 297 is positioned in accordance with the differences in the logarithms represented by the points 285 and 298 or in other words with the deviation of the actual fuel flow from the flow which would, under the prevailing ambient conditions, reproduce the desired curve a.

*Selective operation of flow limiting servos 218 and 219*

In the present instance, the motion of the output end 300 of the comparing lever 297 is utilized through a valve 301 to transfer the control of the fuel valve 6 back and forth between the primary and supervisory controllers at the proper times. The movable element of this valve is a plunger 302 pivotally suspended from the end 300 of the lever 297 and having at its other end two lands 303 and 304 accurately spaced for a purpose to appear later and loosely slidable in a cylinder 305. The lands cooperate with ports 306 and 307 in the cylinder to normally maintin both of the ports at low pressure Po or to cover one or the other of the ports and thereby substantially disable the main servo 216 or to admit fluid at the pressure Pc through passages 308 and 309 to one or the other cylinder 225 or 228 and thus override the governor 56 and force a change in the fuel flow.

Between the lands 303 and 304 the cylinder 305 communicates with the supply of fluid at the control pressure Pc, opposite ends of the cylinder being at the low pressure Po. A compression spring 310 acting against the land 304 serves to hold the follower 298 against its cam at all times. It will be observed that the lands 303 and 304 are both disposed between the ports 306 and 307 when the plunger is in the normal position as shown in FIG. 12, the chambers 228 and 225 of both of the servos 218 and 219 then being connected to the low pressure space.

When, during acceleration of the prime mover, the actual flow of fuel as determined by the action of the governor and represented by the position of the point 298 reaches the maximum permissible value computed for the prevailing speed and air density, the plunger 302 will be lowered far enough for the land 303 to overlap the port 306 as illustrated in FIG. 15. Such closing of the passage 308 restricts the escape of liquid from the chamber 228 thereby blocking the pistons 227 against movement in the fuel increasing direction. Control of the fuel valve by the governor 56 is thus limited, and the rate of increase in the fuel flow is properly correlated with the acceleration of the engine following a change in the setting of the throttle lever.

A change in one of the parameters while the cylinder 228 is blocked, may result in the movement of the valve plunger 302 downwardly beyond the position shown in FIG. 15. In such a case, the port 306 will be uncovered admitting fluid at the pressure Pc to the cylinder 228. The servo 218 is thus energized to supplement the force of the biasing servo 217 and thereby override the servo 216 and the speed governor and move the fuel valve 6 toward the closed position.

Similar limiting of the rate of decrease of the fuel flow may occur during a rapid deceleration of the engine following a change in the throttle position. In such a case, the plunger 302 will move upwardly until the land 304 covers the port 307 as shown in FIG. 14. The escape of fluid from the chamber 225 through the passage 309 will thus be restricted preventing further closing of the main fuel valve 6 by the biasing servo 217 even though the governor 56 is calling for such closing. If for any reason the land 304 is moved up above the port 307, pressure fluid will flow to the cylinder 225 thereby overcoming the servo 217 and causing the fuel valve 6 to be opened independently of the governor control.

*Operation of limit and override controls*

Let it be assumed that the various linkages and cams are shaped and proportioned to produce a flow schedule as shown in FIG. 16. That is to say, under normal operating conditions, the fuel flow will change with the speed along the curve $a$. At all of the flows, the lands 303 and 304 of the valve 301 will be disposed between the ports 306 and 307 and the cylinders of both of the servos 218 and 219 will be connected to the low pressure space. The fuel valve is thus positioned under the sole control of the governor 56 acting through the main servo 216 and the biasing servo 217.

The positions of the maximum and minimum flow curves $b$ and $c$ in relation to the normal operating curve $a$ are determined by the spacing of the lands 303 and 304 which are disposed close enough together to maintain both of the ports 306 and 307 uncovered and the servos 218 and 219 connected to the low pressure space while the point 300 of the computer is moving through a predetermined range corresponding to the permissible variation between the actual and the desired fuel flows. That is to say, if for an engine speed $s$ (FIG. 16), the actual flow of fuel rises above the required normal flow $f$, the plunger 302 will be moved below the centered position shown in FIG. 12, the land 303 closing more of the port 306. When the deviation reaches the maximum permissible for the speed $s$ as indicated at $d$, the port 302 will have been completely covered by the land 303 as shown in FIG. 15 thus closing the servo cylinder 228 except for leakage so as to prevent further opening of the fuel valve by the action of the speed governor.

If, while the primary control is thus disabled, any one or more of the parameters changes enough to change the prevailing fuel flow to a point above the curve $b$, the land 303 will pass below the port 306 thus admitting fluid at the pressure Pc to the cylinder 228. The servo 218 is thus quickly energized and, acting in conjunction with the biasing servo 217, will override the governor controlled servo 216 and initiate upwardly movement of the piston 227 and therefore movement of the valve member 201 in the closing direction. Such upward movement of the main servo piston 222 is possible under the conditions resulting in shifting of the fuel flow rate above the maximum curve $b$, the pilot valve 76 of the speed governor will be opened to permit liquid to be forced out of the cylinder 223 of the servo 216.

The closing of the fuel valve by such overriding action corresponds to the deviation of the actual fuel flow away from the permissible maximum. Thus, the closing movement of the main fuel valve is fed back through the cam 299 to raise the valve plunger 302 at least to a position (FIG. 15) which covers the port 306 and interrupts the flow of pressure fluid to the cylinder 228 with the fuel flow at the permissible maximum value $d$.

In a similar way, the valve 301 acts to disable the main governor when the latter attempts to reduce the fuel flow for a given speed $s$ to the computed minimum value $e$ for such speed. At that time, the plunger 302 will be raised far enough for the land 304 to cover the port 307. This limits the escape of liquid from the cylinder 225 through the passage 309 thereby preventing further closing of the fuel valve by the governor control servo 216. If, due to conditions prevailing at any time, the fuel flow value thus established is shifted to a point below the curve $c$, the land 304 will be raised above the port 307. Pressure fluid is thus admitted to the cylinder 225 to move the piston 226 upwardly and correspondingly opening the fuel valve. Such movement of the valve member 201 is transmitted back through the cam 299 thereby adjusting the valve 302 to interrupt the admission of pressure fluid to the servo 219 as the flow rate returns to a point on the curve $c$.

Through the multiple servo arrangement and the manner of its control by the multiple valve 301, it will be apparent that the system above described is extremely versatile and easily produces a wide variety of predetermined flow schedules in response to various combinations of conditions giving rise to the need for limiting or overriding the normal action of the main speed regulator. Thus, by simply varying the relative positions of the lands 303 and 304 along the plunger 302, the spacing of the curves $b$ and $c$ relative to each other and to the normal operation curve $a$ may be varied as desired. Then, by combining the ambient condition measurements through the cams 253 and 294 and the associated linkages, the shapes of the individual curves $a$, $b$ and $c$ may be changed to suit the requirements of most any prime mover installation.

*Modification of fuel flow during deceleration*

In the operation of certain gas turbines, it is desirable in order to decelerate at the maximum permissible rate, to reduce the fuel flow independently of the engine speed and air temperature and limit such rate under the sole control of the pressure of the air as discharged by the compressor 10. With the controller above described, this may be accomplished simply by disabling that part of the computer mechanism which is responsive to the speed or temperature signals or both of these signals as is preferred. To this end, provision is made for interrupting the connection by which the temperature and speed signals are transmitted to the computer.

The means herein employed for this purpose includes a power actuator 312 operable to move the follower 298 out of active engagement with the cam 294 and controlled automatically in response to the deceleration sensing mechanism above described acting in conjunction with the pressure senser 135 which thereafter acts alone to impose the desired limit on the rate of reduction of the fuel flow following a sudden adjustment of the throttle lever 58 to a lower speed position.

Preferably the actuator 312 is of the hydraulic type comprising a piston 313 slidable in a cylinder 314 between a normal position maintained by a spring 315 as shown in FIG. 12 and a position abutting a stop 316 and resulting from the admission of pressure fluid to the head end of the cylinder through a passage 320. The rod of the piston is adapted for engagement with an adjusting screw 317 on the end of a lever 318 which herein is fulcrumed at 319 intermediate its ends and at its other end is pivotally connected to the computer lever 288 at a point adjacent but outwardly beyond the joint 295. When the servo 312 is energized, the lever 318 is rocked to swing the lever 288 about the roller 289 as a fulcrum thus retracting the follower 293 from its normal contact with the cam 294. The computer is then unaffected by the temperature and engine speed signals so that the point 285 representing the theoretically correct fuel flow is determined by the cam 253 alone and therefore by changes in the compressor outlet pressure. The deceleration sensing mechanism above described may be utilized to advantage in sensing the time and duration of energization of the servo 312. To this end, pressure fluid from the main servo system may be diverted to the cylinder 314 under the control of the valve 301. To this end, the passage 309 is opened at 309ᵃ and connected directly to a passage 320 which thus communicates with the cylinder 314 and also with the cylinder 225 of the minimum limit servo 219 and with the port 307 of the valve 301.

With this arrangement, it will be apparent that when the engine is being decelerated following a reduction in the speed setting of the governor 56, pressure fluid will be forced out of the servo 219 under the action of the biasing servo 217. This is permitted by the escape of fluid out of the cylinder 225 through the passage 309 and valve 301 whose port 307 is then connected to the low pressure space. Now, if the reduction in the fuel flow becomes so rapid as to exceed the minimum rate determined by the normal action of the computer as above described, the plunger 302 of the valve will be raised far enough for the land 304 to close the port 307 as shown in FIG. 15. Thereupon, the fluid forced out of the cylinder 225 will be delivered to the cylinder 314 and the pressure therein will build up as the closing of the fuel valve continues. Such energization of the servo 312 swings the lever 318 downwardly far enough to retract the follower 293 away from the cam 294 as shown in FIG. 14. This is accompanied by downward movement of the link 286 which tends to move the plunger 302 and reopen the port 307 but this is offset by the lowering of the follower 298 by the cam 299 and the consequent raising of the plunger 302 by the closing of the fuel valve 6 while fluid is being delivered to the servo 312.

As a result of these joint actions, the position of the valve plunger 302 remains substantially fixed during the energization of the servo 312, the port 307 remaining substantially covered so as to continue the flow of fluid to the cylinder 314 until the piston 313 encounters the stop 315. Then, the follower 293 will be fully retracted and the control of the valve 301 and its limiting action will be transferred to the pressure responsive cam 253 and the cam 299.

Upon such full energization of the servo 312 with the plunger 302 still closing the port 307, the passage 309 will be substantially blocked and therefore the closing of the fuel valve 6 by the biasing servo will be interrupted. This condition obtains until, as a result of the reduction in compressor pressure which accompanies deceleration of the turbine, the plunger 302 is lowered and the port 307 partially uncovered. The resulting escape of fluid from the passage 309 permits the closing of the fuel valve 6 to resume at a rate determined by the decrease in the compressor outlet pressure which accompanies the deceleration of the turbine.

Control of minimum fuel flow

Means controllable from a remote point is provided for enabling different minimum rates of fuel flow to the prime mover to be established selectively according to the prevailing air density. The means herein shown is adapted to provide two different flow rates when a solenoid 343 is energized and deenergized by manipulating a switch 344 which may be located adjacent the throttle lever 58. Herein, the solenoid plunger is coupled to a valve 345 controlling the escape of fluid from a passage 346 and a cylinder 347 supplied with fluid at the pressure Pc through a restriction 348.

A piston 349 slidable in the cylinder carries a stop pin 350 which, when the valve 345 is closed, is held in a limit position against a stop 351 adjustable by turning a cam 352. In this position, the closing movement of the main fuel valve 6 is arrested as the end of the rod comes against the pin 350. The minimum flow of fuel is thus limited to the higher rate. When the solenoid is energized and the valve 345 opened, the piston is free to move to the head end of the cylinder 347 thus retracting the stop 350 to establish a lower rate of minimum fuel flow.

Limiting fuel flow during excessive compressor pressure

If, for any reason, the pressure in the compressor outlet rises to an abnormally high value, the present control is adapted to impose a limit on the amount of fuel which may be delivered to the prime mover and therefore on the pressure which is developed in the engine structure. In the present instance, the computer and servo mechanisms above described are utilized to perform this additional function. To this end, the cam 253 is shaped beyond its normal high pressure area 354 with an abrupt rise 355 which upon coming into engagement with the follower 289, moves the latter, the connected linkage 288, 297 and the valve plunger 302 far enough to carry the land 303 down below the port 306. As a result, fluid at the pressure Pc is admitted to the cylinder 228 causing the servo 218 to override the governor controlled servo 216 and force a closing movement of the main valve 6. Such reduction in the fuel flow will continue until the abnormal pressure condition is relieved or the fuel flow is reduced to the value determined by the minimum stop 350.

Compensation for fuel temperature changes

With the operating parts mounted within a casing through which the fuel flows, the flow rate and the adjustment of the parts will be varied to some extent by changes in the oil temperature as a result of differential expansion of the metal parts and changes in the viscosity of the oil. In accordance with another aspect of the invention, these changes are compensated for through the association with the various spring loaded pilot valves of thermostatic elements 336, 337 and 338 which are immersed in the fuel within the regulator casing and exert forces on the valve plungers which modify the normal loading of the valves in a direction to compensate for changes in the fuel temperature.

The element 336 is a strip of bimetal anchored at 340 and bearing at its free end against the lower end of the plunger 213 of the pilot valve 208 by which the metering head across the main valve 6 is regulated in accordance with the loading of the spring 212. The strip is arranged to apply a force in oppposition to this spring and which force increases as the temperature of the strip decreases thereby reducing the pressure required to balance the force of the spring 212. Thus, as the fuel becomes cooler and therefore more dense, the pilot valve will be adjusted automatically to maintain a lower pressure differential across the valve 6. The length and stressing of the bi-metal strip is such that the force changes due to temperature changes result in the maintenance of a substantially constant weight-flow rate of the fuel for any given opening of the valve 6.

The elements 337 and 338 also are strips of bimetal mounted cantilever fashion to bear upwardly against the lower ends of the plungers 75 and 271 of the main governor 56 and the speed senser 57. In each of these instances, the upwardly directed forces applied by the spring is decreased with an increase in temperature. Differential expansion between the metal operating parts and their supporting casing is thus compensated for.

*Temperature override of main governor*

In certain gas turbines, it is desirable to prevent operation at the normally permissible maximum speed when the temperature of the air flowing to the compressor is below a predetermined value, for example 10 deg. F. The temperature responsive servo 256 operating through the shaft 262 and the main governor 56 may be utilized advantageously to perform this additional function. Accordingly, the free end of this shaft is adapted to bear against a bell crank 322 which, through a lever 323 fulcrumed at 324, is linked to the free end of the lever 231 which as above described has the spring loaded lost motion connection 236 with the follower 234 of the cam 235 by which the speed setting of the governor 56 is adjusted by the hand lever 58.

When the air temperature detected by the bellows 253 is above the selected minimum value the shaft 262 will be spaced from the bell crank 322 as shown in FIG. 12., such space varying with the setting of the throttle 58. As the temperature falls below this minimum value, the shaft will come against the bell crank rocking the same and the lever 324 to swing the lever 231 counter clockwise and independently of the throttle lever because of the lost motion connection 236. The link 230 is thus shifted upwardly thereby reducing the stress of the governor speeder spring 68 by an amount corresponding to the fall in air temperature below the critical value. Thereafter, the governor speed setting cannot, by manipulation of the throttle lever, be raised to a speed which would be conducive to inefficient or improper operation of the prime mover.

*Manual cut-off of fuel flow*

In practice, it is customary to stop a gas turbine by interrupting the flow of fuel to the burners as by turning the throttle lever or in this instance a separate lever 357 in the direction to move a stem 360 and a valve element 358 thereon against its seat 359 in the turbine fuel supply line. This is conducive, in view of the presence of the automatic pressure regulating valve 205, to the development of objectionably high pressures in the fuel system before the rotating parts of the engine come to rest.

To avoid this difficulty, the present invention contemplates the provision of means brought into play when the fuel is shut off and operating to disable the automatic valve 205 or prevent normal operation thereof from increasing the pressure in the fuel supply inlet to an objectionably high value. This may be accomplished in various ways as by a suitable mechanical or hydraulic connection between the stem 360 and the pilot valve plunger 213 to overcome the spring 212 thereof. In the present instance, such disabling is achieved by establishing an auxiliary path for the flow of fuel through the main control valve 6 while by-passing the prime mover. For this purpose, the stem 360 of the shut-off valve is formed with a by-passage 361 extending through the valve disk 358 into a chamber 362. An outlet 363 from the latter is controlled by a valve 364 normally closed by a spring 365. When a lever 366 is depressed by the valve stem 360 as the fuel is shut off by movement of the disk 358 against its seat, the valve 364 is opened thus permitting fuel to escape to the low pressure area Po. As a result, the flow of fuel through the by-passage 361 thereby preventing the valve 205, during coasting of the prime mover to a stop, from raising the pressure in the inlet side of the fuel valve 6 to an objectionably high value.

This application is a continuation-in-part of my now abandoned applications Serial Nos. 267,397 filed January 21, 1952 and 583,986 filed May 10, 1956.

I claim as my invention:

1. The combination of, a valve, means biasing said valve to close, a power servo having a driven member movable to open and close said valve, a speed responsive governor selectively regulating the energization of said servo to close and open said valve progressively in response to increases and decreases respectively in the speed measured by said governor, manually adjustable means for varying the speed setting of said governor, a speed sensing device having an adjustable speed response setter and selectively controlling the energization of said servo in response to changes in said speed whereby to close and open said valve when the detected speed respectively falls below and rises above the speed setting of said sensing device, a connection for transmitting the movements of said driven member to said speed response setter in varying ratios to increase and decrease the speed setting of said speed sensing device progressively as said valve is opened and closed respectively, temperature responsive means, pressure responsive means, and mechanism jointly controlled by said last two means and operable to increase and decrease the motion transmitting ratio of said connection as the detected temperature decreases and increases respectively and the detected pressure increases and decreases respectively.

2. The combination of, a valve, means biasing said valve to close, a power servo having a driven member movable to open and close said valve, a speed responsive governor selectively regulating the energization of said servo to close and open said valve progressively in response to increases and decreases respectively in the speed measured by said governor, manually adjustable means for varying the speed setting of said governor, a speed sensing device having an adjustable speed response setter and selectively controlling the energization of said servo in response to changes in said speed whereby to close and open said valve when the detected speed respectively falls below and rises above the speed setting of said sensing device, a connection for transmitting the movements of said driven member to said speed response setter in varying ratios to increase and decrease the speed setting of said speed sensing device progressively as said valve is opened and closed respectively, means for sensing changes in air density, and mechanism controlled by said last mentioned means and operable to increase and decrease the motion transmitting ratio of said connection as the air density increases and decreases respectively.

3. In a fuel feed control system for a gas turbine engine having a burner to which air is supplied by a compressor, the combination of, a valve having a member movable back and forth to proportionately vary the rate of fuel flow therethrough, means normally urging said member in the valve closing direction, a first fluid servo having a piston member connected to said valve member for opening said valve upon an increase in pressure in the servo, a primary-speed governor having a speed sensing device adapted to be driven by said turbine engine and operable to admit pressure fluid to said servo and release the fluid therefrom when the detected speed respectively falls below and rises above the speed setting of said device, a second fluid servo having a piston member joined to said valve member and movable in a direction to close valve in response to a pressure increase in the servo, an auxiliary speed senser adapted to be driven by said turbine engine and having a sensing element movable with changes in speed, other sensing elements respectively movable in accordance with air temperature and pressure changes, a second valve having an element movable in opposite first and second directions through a centered position to respectively release fluid from said second servo and admit fluid thereto under sufficient pressure to overcome said first servo, and mechanism combining the motions of said sensing elements and said valve member and applying the resultant thereof to said valve element to move the latter in said first direction in response to closure of said first valve, an increase in said engine speed and decreases and increases respectively in temperature and pressure as determined by said sensing elements.

4. In a fuel feed control system for a gas turbine engine having a burner to which air is supplied by a compressor, the combination of, a valve having a member movable back and forth to proportionately vary the rate of fuel flow therethrough, a first fluid servo having a piston member connected to said valve member for opening said valve upon an increase in pressure in the servo, a primary speed governor having an adjustable speed sensing device adapted to be driven by said turbine engine and operable to admit pressure fluid to said servo and release the fluid therefrom when the detected speed respectively falls below and rises above the speed setting of said device, a second fluid servo having a piston member joined to said valve member and movable in a direction to close said valve in response to a pressure increase in the servo, an auxiliary speed senser adapted to be driven by said turbine engine and having a sensing element movable with changes in the speed of the turbine engine, other sensing elements respectively movable in accordance with air temperature and pressure changes, a second valve having an element movable in opposite first and second directions through a centered position to respectively release fluid from said second servo and admit fluid thereto under sufficient pressure to overcome said first servo, and mechanism combining the motions of said sensing elements and applying the resultant thereof to said valve element to move the latter in said first direction in response to an increase in said engine speed and decreases and increases respectively in temperature and pressure as determined by said sensing elements.

5. In a fuel feed control system for a gas turbine engine having a burner to which air is supplied by a compressor, the combination of, a valve having a member movable back and forth to proportionately vary the rate of fuel flow, a first fluid servo having a piston member connected to said valve member for opening said valve upon an increase in pressure in the servo, a primary speed governor adapted to be driven by said turbine engine and operable to admit pressure fluid to said servo and release the fluid therefrom when the detected speed respectively falls below and rises above the speed setting of the governor, a second fluid servo having a piston member joined to said valve member and movable in a direction to close said valve in response to a pressure increase in the servo, an auxiliary speed senser adapted to be driven by said turbine engine and having a sensing element movable with changes in the speed of the turbine engine, said senser having a selectively adjustable speed response setter, other sensing elements respectively movable in accordance with air temperature and pressure changes, a second valve having an element movable by said first sensing element in opposite first and second directions through a centered position to respectively release fluid from said second servo and admit fluid thereto under sufficient pressure to overcome said first servo, and mechanism combining the motions of said sensing elements and applying the resultant thereof to said speed response setter and increase and decrease the speed setting of said senser as said air temperature and pressure decreases and increases respectively.

6. For controlling the flow of fuel to a prime mover, the combination of a fuel valve, a power servo having a cylinder and a piston movable therein to open and close said valve upon the admission of pressure fluid to or the release of the same from said cylinder respectively, a governor adapted to be driven by a prime mover and controlling such admission and release of fluid in response to speed decreases and increases respectively, a second similar fluid servo adapted upon the admission of pressure fluid to its cylinder to override said first servo and initiate closing of said valve, a similar third servo adapted upon admission of pressure fluid to its cylinder to override said first servo and initiate opening of said valve, a control valve having a cylinder and spaced ports opening therein communicating with the cylinders of said second and third servos, a plunger having lands spaced apart thereon a distance closer than said ports, opposite ends of said valve cylinder communicating with a low pressure space, means for supplying pressure fluid to said valve cylinder at a point between said lands, and mechanism responsive to a combination of speed, air temperature and air pressure conditions which affect the operation of a prime mover and operable to position said valve plunger selectively.

7. For controlling the flow of fuel to a prime mover, the combination of, a fuel valve, a power servo having a cylinder and a piston movable therein to open and close said valve upon the admission of pressure fluid to or the release of the same from said cylinder respectively, a governor adapted to be driven by a prime mover and controlling such admission and release of fluid in response to speed decreases and increases respectively, a second similar fluid servo adapted upon the admission of pressure fluid to its cylinder to override said first servo and initiate closing of said valve, a similar third servo adapted upon admission of pressure fluid to its cylinder to override said first servo and initiate opening of said valve, a fluid pressure supply line, a low pressure space, a control valve having a movable member operable when disposed within a predetermined range to connect both of said cylinders to said low pressure space, to limit the escape of fluid from the respective cylinders when disposed at opposite limits of said range, and to connect the respective cylinders to said supply line when the valve member is moved outwardly beyond said limit positions, and mechanism responsive to a combination of speed, air temperature and air pressure conditions which affect the operation of a prime mover and operable to position said control valve member selectively.

8. For controlling the flow of fuel to a prime mover, the combination of a fuel valve, a power servo having a cylinder and a piston movable therein to open and close said valve upon the admission of pressure fluid to or the release of the same from said cylinder respectively, a governor adapted to be driven by a prime mover and controlling such admission and release of fluid in response to speed decreases and increases respectively, a second fluid servo coupled to said valve and having a fluid filled chamber and a piston movable therein to force fluid out of the chamber during opening of said valve, a third servo coupled to said valve and having a fluid filled chamber and a piston movable therein to force fluid out of the chamber during closing of the valve, means defining a low pressure space, a control valve having a movable member operable when disposed within a predetermined range to connect both of said chambers to said low pressure space and to block the escape of fluid from the respective chambers when disposed at opposite limits of said range, and mechanism responsive to a combination of speed, air temperature and air pressure conditions which affect the operation of a prime mover and operable to actuate said valve selectively.

9. For controlling the flow of fuel to a prime mover, the combination of a main fuel valve, a power servo having a cylinder and a piston movable therein to open and close said valve upon the admission of pressure fluid to or the release of the same from said cylinder respectively, a governor adapted to be driven by a prime mover and controlling such admission and release of fluid in response to speed decreases and increases respectively, a second fluid servo coupled to said valve and having a fluid filled chamber and a piston movable therein to force fluid out of the chamber during opening of said valve, a third servo coupled to said valve and having a fluid filled chamber and a piston movable therein to force fluid out of the chamber during closing of the valve, a lever having two input points and an output point spaced along its length, a second valve having an element coupled to said output point and adapted when disposed in spaced positions to block the escape of fluid from said first and second chambers respectively, means movable with said valve member and moving one of said input points in accordance with the actual fuel flow through said main valve, devices for sensing changes in speed, temperature and pressure conditions which affect the operation of a prime mover, and means responsive to a combination of such conditions to determine a designed permissible fuel flow range at the prevailing conditions and correspondingly adjust the position of said other lever input point.

10. For use in regulating the fuel flow to a prime mover, the combination of, a valve having a member movable back and forth to vary the flow through the valve, a power actuator for said valve member, a primary speed governor controlling the energization of said actuator to regulate the opening of said valve, a fluid filled chamber and a piston slidable therein and coupled to said valve member, a control valve controlling the escape of fluid out of said chamber and having a movable control element, a speed measuring device, a device for measuring the value of an air pressure condition which affects the operation of a prime mover, mechanism combining the measurements by said devices and computing a permissible range of fuel flow for each different measured speed, and means continuously comparing the prevailing actual fuel flow as determined by the position of said valve member with the output of said computing mechanism and moving said control element back and forth in accordance with changes in actual fuel flow and in said permissible range whereby to maintain said control valve opened while the actual fuel flow is within the prevailing computed range and to close the control valve when such actual fuel flow reaches a limit of such range.

11. A fuel regulator as defined in claim 10 in which said power actuator for said valve member comprises a second fluid filled cylinder and a piston slidable therein in unison with said first piston and said governor controls the admission of pressure fluid to and the release thereof from said second cylinder.

12. A fuel regulator as defined in claim 11 in which said control valve comprises a cylinder communicating at points axially spaced along its length with a pressure source and a space maintained at a relatively lower pressure, said valve cylinder having a port communicating between said points with said chamber, and a land slidable in said valve cylinder and carried by said movable control element in a position to cover said port when the fuel flow reaches said computed permissible limit but to connect said space and pressure source to said second cylinder when the actual fuel flow is respectively below and above such limit.

13. A fuel flow regulator as defined in claim 10 which includes means for supplying liquid fuel under pressure to said valve while maintaining a constant pressure drop across said valve so that the actual flow of fuel through the valve opening corresponds to the position of said valve member and in which said computing mechanism includes an output member movable back and forth in accordance with the computed permissible limit of fuel flow and said comparing means comprises a floating lever having two input points and one output point spaced apart along the length of the lever, said output point being connected to said control valve element and said input points being connected to and movable in unison with said valve member and said output member respectively.

14. In a fuel regulating system, the combination of, a fuel valve, a speed governor having a servo coupled to said valve for normally closing and opening the valve as the speed sensed by the governor rises above and falls below the governor speed setting respectively, devices for sensing changes in conditions of speed and air temperature and pressure, a system normally adjusted by each of said devices and computing maximum and minimum limits of a permissible range of fuel flow for each prevailing set of conditions, mechanism controlled by said system for disabling said governor when said maximum limit is exceeded during periods of acceleration, and means also controlled by said system and rendered operative automatically during a period of deceleration and when the flow through said fuel valve has decreased substantially to said minimum limit to withdraw said speed and temperature sensing devices from the control of said system and leave the latter within the sole control of said pressure sensing device.

15. A fuel regulator as defined in claim 14 in which said withdrawal of said temperature and speed sensing devices from control of the computing system is effected by an auxiliary fluid servo normally inactive when said control valve is open and activated automatically as an incident to closure of the control valve.

16. For regulating the flow of fuel to a prime mover, the combination of, a fuel valve, a speed governor adapted to be driven by a prime mover and having a servo for closing and opening said valve as the detected speed increases and decreases relative to the governor speed setting respectively, a system responsive to speed, temperature and pressure conditions which affect the operation of a prime mover and operable to compute maximum and minimum limits of a permissible range of fuel change for each combination of such conditions, means controlled by said system for limiting the operation of said servo in accordance with the prevailing values of such limits, and means operable automatically when the fuel flow reaches said minimum limit during a deceleration period to withdraw said system from the control of said temperature and speed conditions and render the same responsive to air pressure changes alone.

17. For regulating the flow of fuel to a prime mover, the combination of, a fuel valve, a rotary shaft coupled to said valve, first and second hydraulic servos angularly spaced around said shaft and coupled thereto for respectively opening and closing the valve, said second servo being normally energized and biasing said valve to close, a speed governor adapted to be driven by a prime mover and controlling the selective energization of said second servo, third and fourth servos having pistons coupled to said shaft and movable in opposite directions during opening and closing of said valve, devices adapted to sense change in speed and air temperature and pressure, a system controlled by said devices for determining the maximum and minimum permissible limits of opening of said valve for each combination of such conditions, means for comparing the actual opening of said valve with the computed limits, and valve means actuated by said comparing means and operable to restrict the escape of fluid from said third and fourth servos when said maximum and minimum limits of valve opening are reached.

18. For regulating the flow of fuel to a prime mover, the combination of, a fuel valve, a speed governor having a speeder spring and a power servo coupled to said valve for adjusting the same in accordance with deviations from a speed determined by the setting of said spring, a manually operable throttle for changing such setting, means for sensing the changing values of a plurality of conditions including air, temperature and pressure which affect the operation of a prime mover and operable to impose a limit on the rate of opening of said valve under the control of said governor, said last mentioned means including a member movable back and forth with ambient air temperature changes, and mechanism providing a lost motion connection between said member and said speeder spring and operable to reduce the speed setting thereof independently of said throttle and progressively as the air temperature decreases below a value determined by the prevailing setting of said throttle.

19. A valve selectively operable to vary the value of a primary condition to be controlled, a power servo having a cylinder and a piston movable therein to open and close said valve upon the admission of pressure fluid to or the release of the same from said cylinder, a senser responsive to changes in said primary condition and controlling such admission and release of fluid in response to decreases and increases in the value of the condition, a second similar fluid servo adapted upon the admission of pressure fluid to its cylinder to override said first servo and initiate closing of said valve, a similar third servo adapted upon admission of pressure fluid to its cylinder to override said first servo and initiate opening of said valve, a control valve having a cylinder and spaced ports opening therein communicating with the cylinders of said second and third servos, a plunger having lands spaced apart thereon a distance closer than said ports, opposite ends of said valve cylinder communicating with a low pressure line, means for supplying pressure fluid to said valve cylinder at a point between said lands, and mechanism responsive to a secondary condition for selectively positioning said valve plunger.

20. The combination of, a regulator having a driven member movable back and forth to vary the value of a primary condition to be controlled, a power actuator for said member, a primary condition senser controlling the energization of said actuator to regulate the positioning of said member, first and second servos having fluid filled cylinders and adapted upon the admission of pressure fluid to the respective cylinders to override said actuator and move said member in opposite directions, a control valve having an element movable through a predetermined range and operable to open said cylinders when within such range, to close the respective cylinders when at opposite ends of said range, and to admit pressure fluid to the respective cylinders when disposed beyond opposite ends of said range, a device respectively operable to sense and measure changes in two secondary conditions, mechanism combining the measurements by said devices and computing a permissible range of movement of said member for different values of said primary condition, and means continuously comparing the prevailing position of said member with the output of said computing means and moving said control element back and forth in accordance with the resultant of such comparison.

21. The combination of, means providing a source of liquid under pressure, a passage for conveying liquid from said source to a point of use, a valve selectively operable to control the flow of liquid from said source through said passage, a second valve for by-passing liquid out of said passage on the inlet side of said first valve, said second valve including a piston exposed on one end to the pressure in said passage on the inlet side of said first valve and urged by such pressure in a direction to increase the opening of said second valve, means for regulating the pressure on the opposite side of said piston to maintain a constant pressure drop across said first valve comprising a third valve including a movable member automatically responsive to the difference in the pressure between said source and said passage on the outlet side of said first valve, and a thermostatic element responsive to changes in the temperature of said liquid and operable to proportionately adjust said member and vary the magnitude of said pressure drop so as to compensate for changes in the density of said liquid due to said temperature changes.

References Cited in the file of this patent

UNITED STATES PATENTS

| | | |
|---|---|---|
| 2,489,586 | Ray | Nov. 29, 1949 |
| 2,564,127 | Orr | Aug. 14, 1951 |
| 2,581,276 | Mock | July 1, 1952 |
| 2,720,751 | Kunz | Oct. 18, 1955 |
| 2,759,549 | Best | Aug. 21, 1956 |
| 2,786,331 | Williams | Mar. 26, 1957 |
| 2,823,738 | Gibney | Feb. 18, 1958 |